United States Patent
Bahar et al.

(10) Patent No.: US 7,574,443 B2
(45) Date of Patent: Aug. 11, 2009

(54) SCALABLE CLUSTERED STORAGE SYSTEM

(75) Inventors: Cameron Bahar, Los Altos, CA (US); Joseph Hopfield, Culver City, CA (US); Naveen Nalam, San Francisco, CA (US); David B. Zafman, Calabasas, CA (US); Rasoul Oskouy, Los Altos, CA (US)

(73) Assignee: ParaScale, Inc., Cupertino, CA (US)

( * ) Notice: Subject to any disclaimer, the term of this patent is extended or adjusted under 35 U.S.C. 154(b) by 127 days.

(21) Appl. No.: 11/459,902

(22) Filed: Jul. 25, 2006

(65) Prior Publication Data

US 2007/0022087 A1 Jan. 25, 2007

Related U.S. Application Data

(60) Provisional application No. 60/702,428, filed on Jul. 25, 2005, provisional application No. 60/702,429, filed on Jul. 25, 2005.

(51) Int. Cl.
*G06F 17/30* (2006.01)
*G06F 12/00* (2006.01)

(52) U.S. Cl. .................. 707/10; 707/1; 707/200; 707/201; 707/204; 711/100; 711/162

(58) Field of Classification Search .................. None
See application file for complete search history.

(56) References Cited

U.S. PATENT DOCUMENTS

| | | | | |
|---|---|---|---|---|
| 4,412,285 A | 10/1983 | Neches et al. | ............... | 709/252 |
| 4,851,988 A | 7/1989 | Trottier et al. | ............... | 709/226 |
| 5,899,986 A | 5/1999 | Ziauddin | ............... | 707/2 |
| 6,088,766 A * | 7/2000 | Bachmat et al. | ............... | 711/114 |
| 6,167,457 A | 12/2000 | Eidson et al. | ............... | 719/328 |
| 6,446,141 B1 | 9/2002 | Nolan et al. | ............... | 710/8 |
| 6,718,347 B1 | 4/2004 | Wilson | | |
| 6,820,135 B1 | 11/2004 | Dingman et al. | ............... | 709/246 |
| 6,826,613 B1 | 11/2004 | Wang et al. | ............... | 709/227 |
| 6,968,345 B1 | 11/2005 | Muhlestein | ............... | 707/103 R |
| 6,976,090 B2 | 12/2005 | Ben-Shaul et al. | ............... | 709/246 |
| 7,293,107 B1 * | 11/2007 | Hanson et al. | ............... | 709/245 |
| 2001/0039548 A1 | 11/2001 | Shinkai et al. | | |
| 2002/0156613 A1 | 10/2002 | Geng et al. | | |
| 2003/0229682 A1 * | 12/2003 | Day | ............... | 709/219 |
| 2005/0050054 A1 | 3/2005 | Clark et al. | ............... | 707/100 |

(Continued)

OTHER PUBLICATIONS

U.S. Patent And Trademark Office, Official Action Mailed May 15, 2008 In Related U.S. Appl. No. 11/459,906, pp. 1-7, With Corresponding Reply to Official Action Filed Sep. 15, 2008.

(Continued)

*Primary Examiner*—Greta L Robinson
*Assistant Examiner*—James J Wilcox
(74) *Attorney, Agent, or Firm*—Trop, Pruner & Hu, P.C.

(57) ABSTRACT

A scalable clustered storage system includes a control node and a plurality of storage nodes. The control node stores object identifiers and location information associated with a plurality of files. The plurality of storage nodes stores the plurality of files. A storage node in the plurality of storage nodes receives a request for a file in a file system from a client. The storage node then communicates with the control node to determine an object identifier and location information associated with the file. The storage node accesses the file in the file system to service the request from the client using the object identifier and location information associated with the file.

20 Claims, 23 Drawing Sheets

U.S. PATENT DOCUMENTS

2005/0091187 A1  4/2005  Madhavarapu et al. ......... 707/1
2005/0195660 A1* 9/2005  Kavuri et al. .......... 365/189.05

OTHER PUBLICATIONS

U.S. Patent And Trademark Office, Official Action Mailed Aug. 7, 2008 In Related U.S. Appl. No. 11/459,909, pp. 1-8, With Corresponding Reply to Official Action Filed Oct. 29, 2008.

U.S. Patent And Trademark Office, Official Action Mailed May 27, 2008 In Related U.S. Appl. No. 11/459,905, pp. 1-13, With Corresponding Reply to Official Action Filed Sep. 25, 2008.

United States Patent and Trademark Office, Final Office Action dated Dec. 11, 2008 in related patent application U.S. Appl. No. 11/459,906, pp. 1-15.

* cited by examiner

```
<rules>        ::=    <rule>
               ::=    <rules> <rule>

<rule>         ::=    <condition> <designations>

<condition>    ::=    ( <condition> )
               ::=    <condition> | <condition>
               ::=    <condition> & <condition>
               ::=    ~ <condition>
               ::=    <criteria>

<criteria>     ::=    <name> : <regexp>
               ::=    <name> <relation> <constant>
               ::=    <name> = ( <value list> )

<value list>   ::=    <name>
               ::=    <value list> | <name>

<designations>     ::= <count> <storeclass>
                   ::= <storeclass>
                   ::= <designations> <storeclass>

<storeclass>   ::= <name>
               ::= <qualifier> <storeclass>

<qualifier>    ::= { same, different, far, near,
                     leastfull, leastbusy, next }

<relation>     ::= { =, !=, <, >, <=, >= }
```

FIG. 13

SCALABLE CLUSTERED STORAGE SYSTEM

CROSS-REFERENCES TO RELATED APPLICATIONS

This application claims the benefit of U.S. Provisional Application No. 60/702,428, filed Jul. 25, 2005 and entitled "Scalable Clustered Storage System," and U.S. Provisional Application No. 60/702,429, filed Jul 25, 2005 and entitled "Grid Management System," the disclosures of which are herein incorporated by reference for all purposes.

BACKGROUND OF THE INVENTION

Embodiments of the present invention generally relate to computer systems, and more specifically to a scalable clustered storage system.

In traditional file storage systems or file servers, such as network attached storage (NAS), data is controlled and housed in silos using large monolithic, closed, proprietary systems. In order to handle the exponential file data growths in enterprises, companies are forced to deploy many file servers and split their data across these file servers in a manual and static way. Having multiple independent file servers causes data migration, data sharing, load and capacity balancing, and high availability problems. In addition each file server essentially limits the bandwidth available for a whole file system that causes significant performance issues for many classes of applications.

Another problem with traditional file systems is that both the metadata handling and the block allocation modules are performed in a single integrated file system. As more users need to access these file systems and perform random read/write operations, the block allocation processing modules in the file system slow down the general file storage system and cause bottlenecks as described herein. What is needed are seamless incremental expansion of the file storage systems in both capacity and bandwidth while maintaining a single system image to the users of this system.

BRIEF SUMMARY OF THE INVENTION

Embodiments of the present invention generally relate to computer systems, and more specifically to a scalable clustered storage system.

According to one embodiment of the invention, a storage system includes a control node and a plurality of storage nodes. The control node is stores object identifiers and location information associated with a plurality of files in a file system. The plurality of storage nodes stores the plurality of files in the file system. A storage node in the plurality of storage nodes receives a request for a file from a client, communicates with the control node to determine an object identifier and location information associated with the file, and accesses the file using the object identifier and location information associated with the file to service the request from the client.

In some embodiments, the control node stores namespace and metadata associated with the plurality of files. The control node may store the object identifiers associated with the plurality of files using a file system at the control node. The control node may store the location information associated with the plurality of files using a database. The storage node may use the object identifier and location information associated with the file to access the file from a remote object storage available on a second storage node in the plurality of storage nodes. The storage node may use the object identifier and location information associated with the file to access the file from a portion of the file system located at the storage node.

In one embodiment, a token manager coordinates access to the file, where the file is stored at a first location of file system and at a second location of the file system. The token manager may generate a first token including a first access time in response to a first request from a first storage node in the plurality of storage nodes to access the file, the first token allowing the first storage node to access the file in the first location based on the first access time. The token manager may further generate a second token including a second access time in response to a second request from a second storage node in the plurality of storage nodes to access the file, the second token allowing the second storage node to access the file in the second location based on the second access time. The first request or the second request for accessing the file may include a request to write to the file.

In one embodiment, a method of servicing requests for files in a file system is disclosed. The method includes storing object identifiers and location information associated with a plurality of files; receiving a request for a file from a client; determining an object identifier and location information associated with the file; and accessing the file using the object identifier and location associated with the file to service the request from the client.

In one embodiment a computer program product for a computer system having a processor is disclosed. The computer program product includes code for storing object identifiers and location information associated with a plurality of files; code for receiving a request for a file from a client; code for determining an object identifier and location information associated with the file; code for accessing the file using the object identifier and location associated with the file to service the request from the client; and wherein the codes reside on a computer readable medium.

A further understanding of the nature and the advantages of the inventions disclosed herein may be realized by reference of the remaining portions of the specification and the attached drawings.

BRIEF DESCRIPTION OF THE DRAWINGS

FIG. 13 is an example of a general grammar for rules defining storage classes according to one embodiment of the present invention.

DETAILED DESCRIPTION OF THE INVENTION

Figure 1:
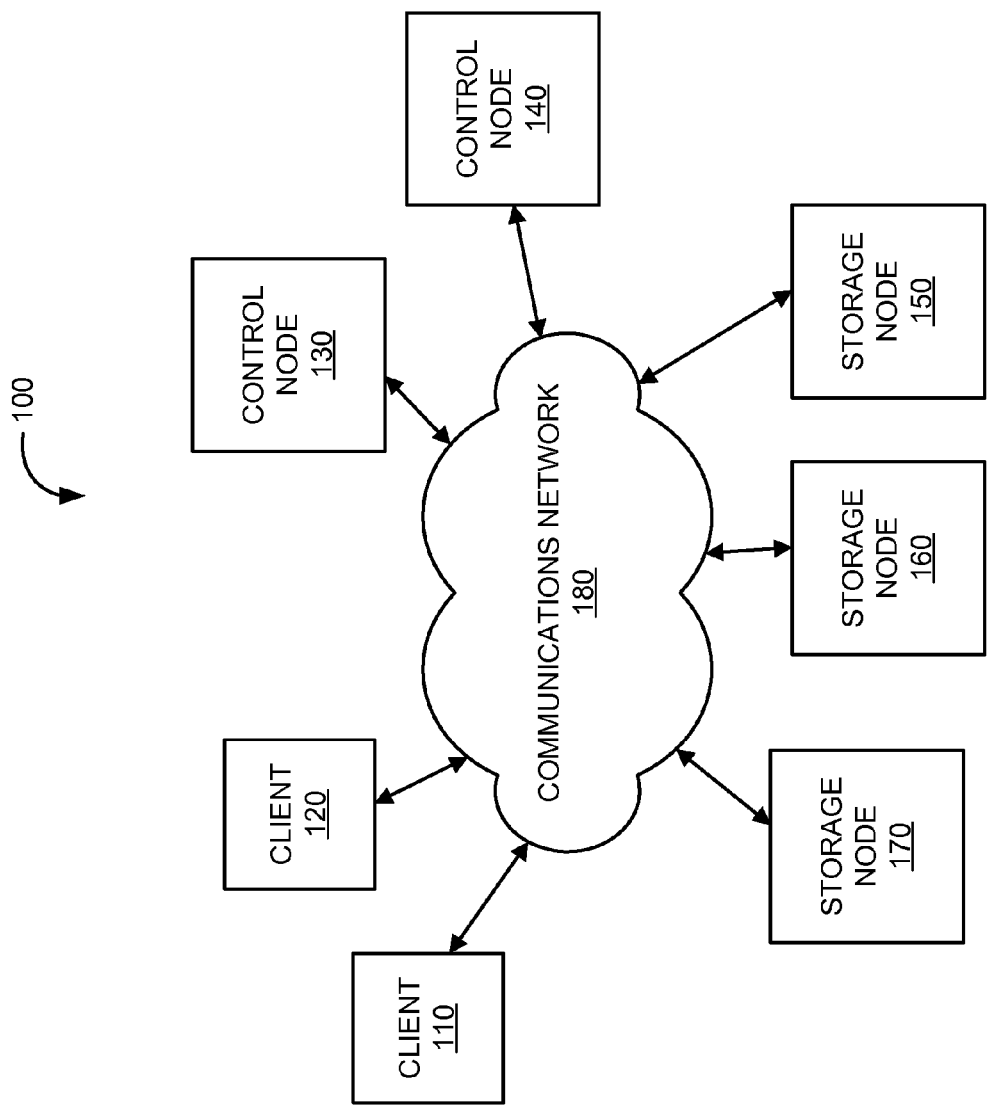
FIG. 1 is an illustration of a clustered storage system according to an embodiment according to the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Clustered Storage System

According to various embodiments, a scalable clustered storage system separates namespace and metadata attributes of files in a file system from the actual data content of files. In one embodiment, one or more servers, called control nodes, are responsible for handling the namespace, metadata, and location information of files. One or more servers, called storage nodes, are responsible for the physical storage and access to files in the file system. Each storage node typically employs a shared-nothing architecture, meaning that each storage node has its own block storage device, whether local or attached through a storage area network (SAN) and the like.

In the clustered storage system, the file system itself spans both control nodes and storage nodes, as is not physically tied to a particular server. Accordingly, the clustered storage system scales in several dimensions. Storage nodes may be added in order to scale capacity and bandwidth for serving files stored in the file system. Each storage node may provide both processing and storage capabilities. Moreover, control nodes may be added to distribute the load of metadata operations.

In some embodiments of the clustered storage system, users (e.g., client computer systems) may use industry standard protocols without modification to mount exported file system and to access files within the storage system from storage nodes. In some embodiments, the clustered storage system provides a global namespace allowing users to see the entire file system regardless of the storage node used for access to the file system.

Accordingly, a storage system in one embodiment of the present invention includes a control node that stores metadata, object identifiers, and location information associated with a plurality of files in a file system and a plurality of storage nodes that store the plurality of files. A storage node in the plurality of storage nodes is capable of receiving a request for a file in the file system from a client. The storage node communicates with the control node to determine metadata, an object identifier, and location information associated with the file. The storage node then accesses the file in the file system to service the request from the client using the metadata, the object identifier, and the location information received from the control node.

FIG. 1 is an illustration of a clustered storage system 100 according to an embodiment according to the present invention. Storage system 100 includes clients 120 and 130, control nodes 130 and 140, and storage nodes 150, 160, and 170. Clients 120 and 130, control nodes 130 and 140, and storage nodes 150, 160, and 170 are communicatively coupled using a communications network 180.

Typically, clients 110 and 120 are computer systems such as personal computers (PCs), workstations, laptops, personal digital assistants (PDAs), servers, mainframes, and the like. The clients 110 and 120 are configured to access remote files and file systems using file access protocols, such as NFS, CIFS, HTTP, FTP, and the like.

Figure 2:
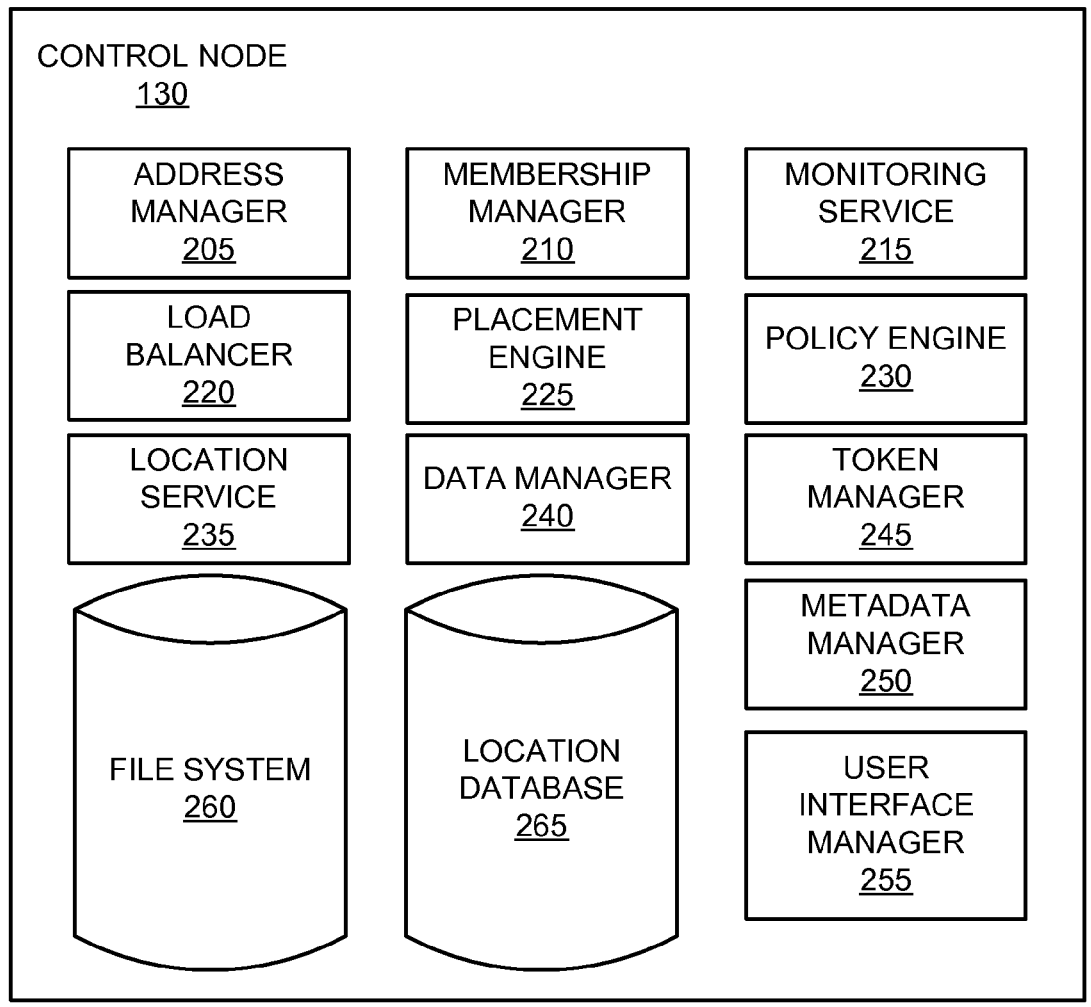
FIG. 2 is a block diagram of a control node according to an embodiment of the present invention.

Control nodes 130 and 140 may be PCs, workstations, servers, mainframes, and the like. Control nodes 130 and 140 may store information associated with files in a file system on a local file system, network attached storage (NAS), a storage area network (SAN), a database, and the like. Control nodes 130 and 140 may also store information associated with files in a file system in a combination of a local file system and a database. One example of a computer system suitable for implementing control nodes 130 or 140 is shown in FIGS. 2 and 8.

Figure 3:
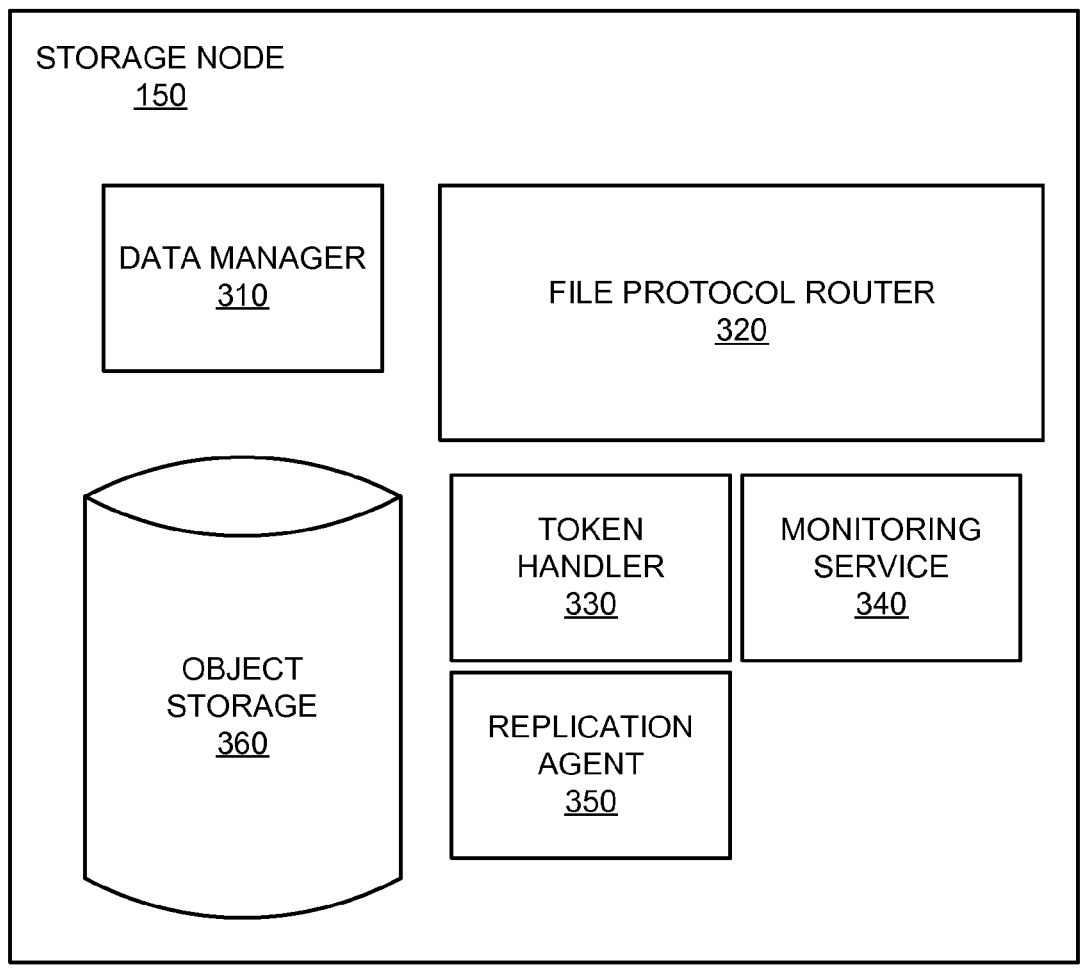
FIG. 3 is a block diagram of a storage node according to an embodiment of the present invention.

Storage nodes 150, 160, and 170 are any hardware and/or software elements configured to store files in a file system. Storage nodes 150, 160, and 170 may be PCs, workstations, servers, mainframes, and the like. Storage nodes 150, 160, and 170 may implement one or more file systems to store files, such as NTFS, EXT, XFS, GFS, and the like. One example of a computer system suitable for implementing control nodes 130 or 140 is shown in FIGS. 3 and 8.

Information associated with files in a file system includes namespace, metadata, an object identifier and location information. Namespace includes a hierarchical tree-based file path and naming scheme common in most file systems. Metadata includes file attributes, such as a file name, permissions, size, type, and the like. Object identifier is a cluster-wide globally unique 128-bit id that is used for naming and storage of files in an object store on a storage node. Location information includes information associated with the logical and/or physical location of a file in a file system. For example, the location information may specify a given storage node, an object store attached to a storage node, path information, and the like.

In one example of operation, client 110 sends a request for a file in a file system, such as a request to read from a file, to storage node 150. Storage node 150 then communicates with control nodes 130 and 140 to determine metadata, object identifier, and location information associated with the file and optimally caches this information locally in its RAM. In this example, control node 130 determines an object identifier associated with the name of the file, and from the object identifier, determines the location of the file. Control node 130 sends the object identifier and the location of the file to storage node 150. Operations of the control node 130 are described further with respect to FIGS. 2 and 4.

Storage node 150 uses the object identifier and the location of the file to access the file in the file system. For example, the location information may direct storage node 150 to access the file on storage node 160. In some embodiments, storage node 150 may read and write files from or to storages nodes 160 and 170 using an Internet Protocol (IP) based transport mechanism, some examples of which are HTTP or NFS cross mounts. The location information may also direct storage node 150 to access the file using a portion of the file system stored on the storage node 150. Operations of the storage node 150 are described further with respect to FIG. 3 and 4.

According to various embodiments, the storage system 100 separates namespace, metadata and location information associated with files in a file system from the actual storage of the files by the storage nodes 150, 160, and 170. Accordingly, various embodiments provide enhanced access to file system objects using the storage system 100 regardless of the location of a file within a storage node. Additionally, in various embodiments, additional control nodes and additional storage nodes may be added to the storage system, increasing storage capacity and reducing file access time in the storage system.

In some embodiments, a pool of network addresses, such as Internet Protocol (IP) addresses may be allocated and assigned to storage nodes 150, 160, and 170 by control nodes 130 and 140. Upon a storage node failure (e.g., storage node 150), control nodes 130 and 140 dynamically reassign the network address (e.g., the IP address) associated with the failed storage node 150 to a functioning storage node (e.g., storage node 160). Thus, client/user access to files previous using storage node 150 may be transparently moved and/or redirected to a new storage node (i.e., storage node 160).

FIG. 2 is a block diagram of control node 130 according to an embodiment of the present invention. In general, access to files in a file system funnels a single namespace. Control node 130 maintains the mapping between names and files in the namespace, and provides APIs to allow access to maps from pathnames to unique object identifiers and the reverse. In this example, control node 130 includes an address manager 205, a membership manager 210, a monitoring service 215, a load balancer 220, a placement engine 225, a policy engine 230, a location service 235, a data manager 240, a token manager 245, a metadata manager 250, a user interface manager 255, a file system 260, and a location database 265.

Address manager 205 includes hardware and/or software elements configured to provide address management for control node 130. For example, control node 130 may be configured to response to one or more Internet Protocol (IP) addresses to services requests for files in a file system. Address manager 205 may also provide address management to one or more storage nodes in the storage system 100. Address manager 205 may allocate IP addresses to a storage node (e.g., storage nodes 150, 160, and 170) based on performance, capacity, policies, and other criteria collected and associated with a storage node.

Membership manager 210 includes hardware and/or software elements configured to determine membership of control node 130 and storage nodes that join or leave the storage system 100. Monitoring service 215 includes hardware and/or software elements configured to monitor and report the status of control nodes (e.g., control nodes 130 and 140) and storage nodes (e.g. storage nodes 150, 160, 170), such as uptime, throughput, and the like.

Load balancer 220 includes hardware and/or software elements configured to provide balancing of file system requests between one or more storage nodes. Load balancer 220 may redirect access to files in a file system from clients 120 and 130 in response to load on storage nodes 150, 160, and 170, capacity, location of the client, and the like.

Placement engine 225 includes hardware and/or software elements configured to determine the placement of files in a file system. For example, placement engine 225 may determine to store MP3 files on storage node 160 and AVI video files on storage node 170. Placement engine 225 may determine placement of files based on files attributes, such as size, type, extension, and capacity, performance, and the like, of a storage node, as well as the particular type of a disk volume attached to a storage node.

Policy engine 230 includes hardware and/or software elements configured to provide rules-based policies for automatic placement, migration, and replication of files in the clustered storage system. Policy engine 230 allows a user, such as an administrator, to specify reliability targets and policies for different classes of data, (e.g., storage classes). These policies can take into account file attributes like path, file type, mod-time, size, etc.

Location service 235 includes hardware and/or software elements configured to determine the location of a file in a file system. In various embodiments, the storage system 100 has the ability to move data between volumes and storage nodes without interrupting or affecting client use. For example, data associated with client 110 may be migrated from storage node 160 to a volume associated with storage node 170, with no downtime noticed by client 110. In various embodiments, files have unique object identifiers, and files are stored in volumes associated with volume identifiers. Location service 235 tracks the location of files in the storage system 100 and provides an API to query and update this information. Location service 235 also may track which storage nodes are storing which volumes, and may also maintain information related to how much free space exists on a volume, and other attribute information about volumes, such as performance and the like.

The data manager 240 includes hardware and/or software elements configured to provide data management services. In general, in order to tolerate failures in storage nodes 150, 160, and 170, multiple copies of files may be stored throughout the storage system 100. In some embodiments, data manager 240 provides "lazy" replication, in which policy and data attributes determine which files take precedence during replication. Data manager 240 may also provide synchronous replication, for synchronous writes—mirroring of sensitive data.

Metadata manager 250 includes hardware and/or software elements configured to manage file attributes associated with files in a file system. Some examples of file attributes are size, ownership and access permission, type, extension, name, and the like.

User interface manager 255 includes hardware and/or software elements configured to provide access to various features of control node 130, such as policy engine 230, through a graphical user interface.

File system 260 includes hardware and/or software elements configured to storage data. In this example, control node 130 stores the namespace, metadata, and an object identifier associated with files in a file system in the file system 260.

Location database 265 includes hardware and/or software elements configured to store location information associated with files in a file system. Some examples of location data 265 are a flat database, a relational database, and the like. The location database 265 may also be part of the file system 260. Typically, files are stored with enough identifying information (volume, name, version history) to allow them to be identified, versions resolved, and the data used by another control node, if necessary.

In various embodiments, the control node 130 may include one or more local or attached block devices, such as hard disks, removable disks, SANS, and the like.

In operation of control node 130, each namespace has a corresponding file system (or isolated file-tree) at control node 130. Control node 130 stores metadata, along with an object identifier, such as a alpha-numeric sequence or the like, associated with an object (e.g., a file) in the file on file system 260 (e.g., the contents of /foo/bar on file system 260 of control node 130 is "object-id=1783 . . . "). The file system 260 may also includes current attributes of files, including ownership, times, and size information. In one example, the file system 260 includes file attributes in a phantom file. For example, "/SHARE_17/foo/bar" is a file which contains the object identifier of /foo/bar, as well as the owner, times, etc. of the file. The phantom file's length may also be set to the length of the file plus 4 k of padding, to store the object identifier and other information associated with the file in the file system. Control node 130 also stores location information associated with files in the file system in location database 265.

According to the previous example, when control node 130 receives a request to access a file in the file system, control node 130 retrieves the file (i.e., the phantom file for the file) from file system 260 to determine metadata associated with the file. Control node 130 retrieves the object identifier form the phantom file, and uses the object identifier to determine location information associated with the file from the location database 265. Control node 130 then returns the object identifier of the file and the location information (e.g., volume identifier, path, etc.) associated with the file to the requester.

According to various embodiments, control node 130 provides separation between metadata and location information of files in the file system, and the actual storage of the files. The separation of metadata and file storage allows flexibility in the storage and retrieval of files because the files can be stored in one location and later moved or migrated.

FIG. 3 is a block diagram of storage node 150 according to an embodiment of the present invention. In general, storage node 150 provides for the storage of the actual files in a file system, with metadata and location information stored on a control node (e.g., control node 130 of FIG. 1). In this example, storage node 150 includes a data manager 310, a file protocol router 320, a token handler 330, a monitoring service 340, a replication agent 350, and an object storage 360.

Data manager 310 includes hardware and/or software elements configured to service requests for files in a file system. File protocol router 320 includes hardware and/or software configured to provide communication between storage node 150 and various file access protocols, such as NFS, CIFS, HTTP, Web-DAV, FTP, and the like.

Token handler 330 includes hardware and/or software elements configured to manage access to files in a file system based on tokens received from a control node. Monitoring service 340 includes hardware and/or software elements configured to monitor and report status information associated with storage node 150.

Replication agent 350 includes hardware and/or software elements configured to replicate files in a file system.

Object storage 360 includes hardware and/or software elements configured to store data. Some examples of object storage 360 are local file systems residing on one or more hard disks, databases, and the like.

In various embodiments, the storage node 150 may include one or more local or attached block devices, such as hard disks, removable disks, SANS, and the like.

In general, storage node 150 communicates with control node 130 to determine metadata, an object identifier, and location information associated with a file as metadata and location information are separated in the storage system 100. In response to a request from a client (e.g., client 110), storage node 150 uses the metadata, object identifier, and location information to service the request from the client 110. The operations of storage node 150 are described further with respect to FIG. 4.

Figure 4:
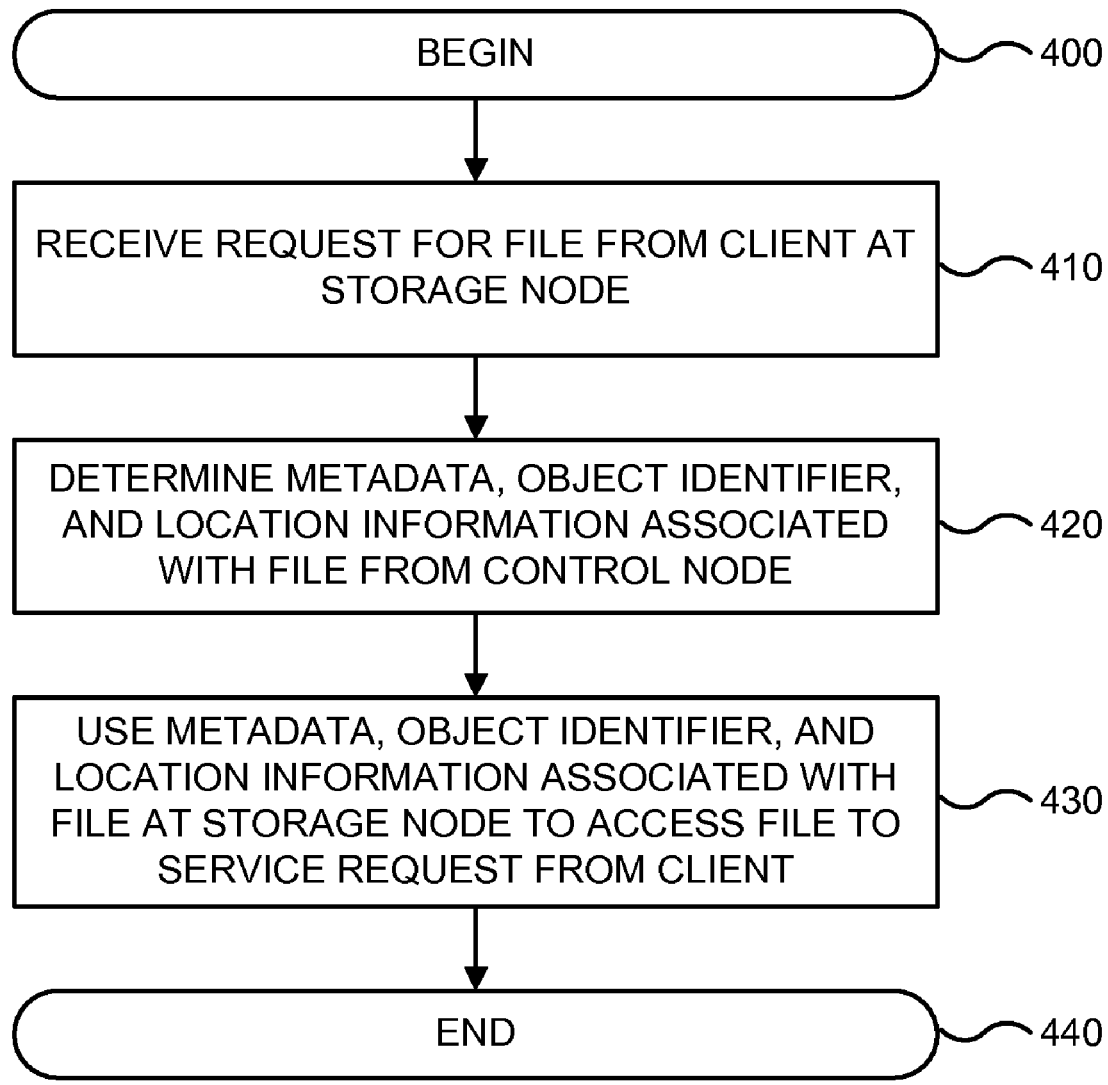
FIG. 4 is a simplified flowchart of a method of servicing requests for files in a storage system according to an embodiment of the present invention.

FIG. 4 is a simplified flowchart of a method of servicing requests for files in a storage system according to an embodiment of the present invention. The processing depicted in FIG. 4 may be performed by software modules (e.g., instructions or code) executed by a processor of a computer system, by hardware modules, or combinations thereof. FIG. 4 begins in step 400.

In step 410, a request for a file from a client (e.g., client 110) is received at storage node 150. The request may be to read from a file, write to a file, change to a directory, and the like. In step 420, storage node 150 determines metadata, and object identifier, and location information associated with the file from control node 130. For example, control node 130 accesses the file (e.g., the phantom or ghost file) in file system 260 to determine an object identifier associated with the file. Control node 130 then uses the object identifier to determine location information from the location database 265, such as volume identifier, path, etc. Control node 130 returns the metadata, including the object identifier, and location information associated with the file to the storage node 150.

In step 430, storage node 150 uses the metadata, object identifier, and location information associated with the file to access the file in the file system to service the request for the file from client 110. In one example, the metadata, object identifier, and location information received from control node 130 by the storage node 150 directs storage node 150 to retrieve the file from object storage 360. Storage node 150 then services the request for the file using the retrieved file from object storage 360. In another example, the metadata, object identifier, and location information received from control node 130 directs storage node 150 to request the file from storage node 160. Storage node 150 may then may cross-mount a portion of the file system hosted by storage node 160 to access the file.

Token Management

Figure 5A:
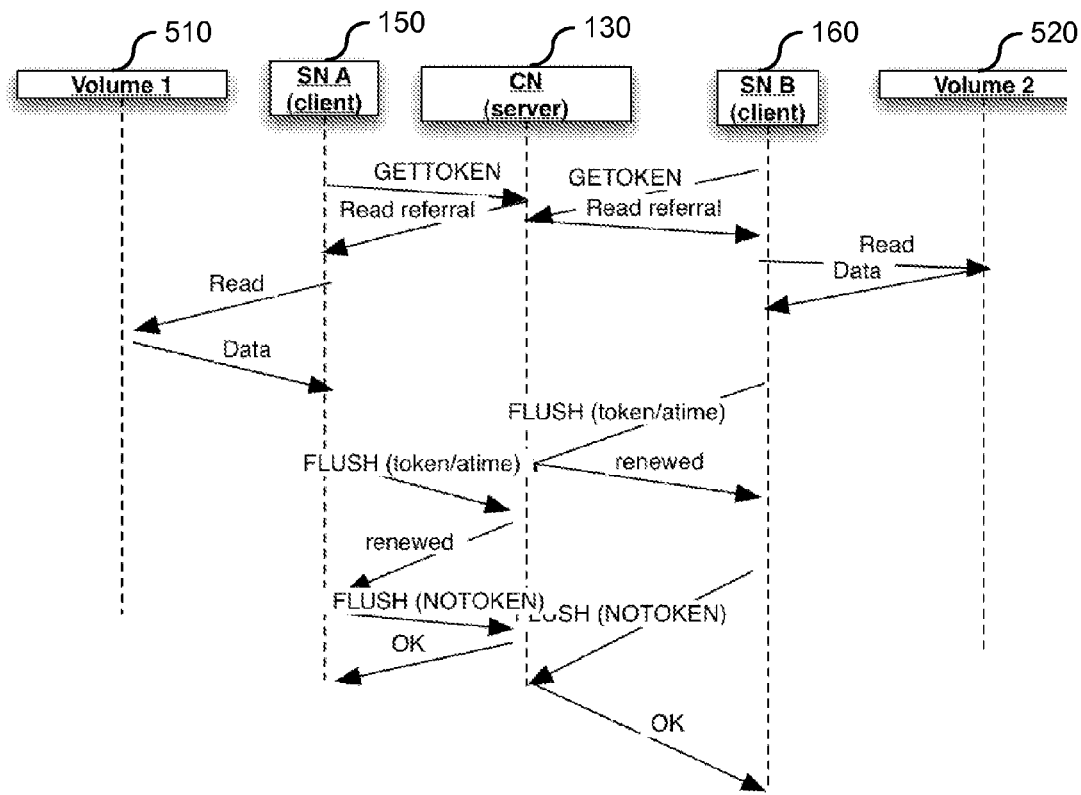
FIG. 5A is a message sequence chart of servicing a request to read from a file in a storage system using tokens according to an embodiment of the present invention.

FIG. 5A is a message sequence chart of servicing a request to read from a file in a file system using tokens according to an embodiment of the present invention. In this example, storage node 150 receives a request from client 110 (FIG. 1) to read from a file in the file system. Storage node 160 receives a request from client 120 to read from the same file in the file system. The file has been replicated to volume_1 510 and to volume_2 520 so that multiple copies of the file exist in the file system.

Storage node 150 communicates with control node 130 to determine metadata and location information associated with the file. In particular, token handler 330 (FIG. 3) of storage node 150 requests a token from control node 130 to read from the file. Control node 130 generates a token allowing read access to the object storage in Volume_1 510 by storage node 150. As discussed above, control node 130 may determine one or more volumes to distribute data storage. Accordingly, control node 130 provides volume information in token to the storage node 150. A token is a lease for file system operations, such as read or write, and includes an access time or lease time. Using the token received from the control node, storage node 150 then reads the file from Volume_1 510 to service the request from the client 110. Storage node 150 may attempt to renew the token, to continue read access to the file in Volume_1 510 as further requested by client 110.

Typically, storage node 150 stores the token received from control node 130, and sets a timeout shorter than the lease time of the token. This allows storage node 150 to renew its lease before the control node 130 expires the token. When the timeout occurs, the token storage node 150 determines whether to renew the lease of the token. For example, in file systems, like CIFS that have open/close in the protocol, an open sets a flag which will ensure that the lease of the token is renewed. In various embodiments, and open mode read or write determines the mode in which the renewal of the token will occur. In another example, for a file system, such as NFS, that does not have open/close in the protocol, storage node 150 monitors actual read and write operations. If a read or a write operation has occurred since the last renewal of the token, another renewal will be requested. In various embodiments, the particular operations, whether read or write, determines in what mode the renewal of the token will occur.

In some embodiments, the token includes information, such as a mode (READ/MASTER), a referral volume identifier, the number of seconds the lease is good for, and a generation number. A storage node returns the generation number to a control node, so that the control node may determine when certain races have occurred. Typically, a control node sets an internal time-out, which when triggered the control node assumes a storage node has let a token lease expire or the storage node has crashed, or is otherwise unavailable.

Referring again to FIG. 5A, storage node 160 also communicates with control node 130 to determine metadata and location information associated with the file. Token handler 330 of storage node 160 requests a token from control node 130 to read from the file. Control node 130 generates a token allowing read access to the object storage in Volume_2 520 by storage node 160. Using the token received from the control node, storage node 160 reads the file from Volume_2 520 to service the request from the client 120. Similarly, storage node 160 attempts to renew the token, to continue read access to the file in Volume_2 520 as further requested by client 120.

Figure 5B:
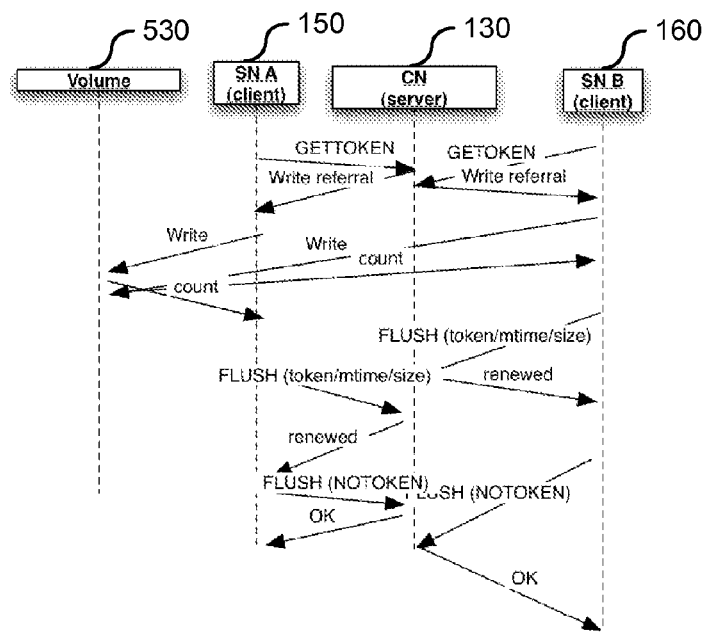
FIG. 5B is a message sequence chart of servicing a request to write to a file in a storage system using tokens according to an embodiment of the present invention.

FIG. 5B is a message sequence chart of servicing a request to write to a file in a file system using tokens according to an embodiment of the present invention. In this example, storage node 150 receives a request from client 110 to write to a file in the file system. Storage node 160 receives a request from client 120 to write to the same file in the file system.

Storage node 150 communicates with control node 130 to determine metadata and location information associated with the file. Token handler 330 of storage node 150 requests a token from control node 130 to write to the file. Control node 130 generates a token allowing a write access operation to the object storage in Volume 530 by storage node 150. Using the token received from the control node, storage node 150 then reads the file from Volume 530 to service the request from the client 110. Storage node 150 may attempt to renew the token, to continue write access to the file in Volume 530 as further requested by client 110.

Redirection and Load Balancing

Given a distributed remote file system service implemented by N servers storing M file systems, the present invention describes techniques and mechanisms for taking client sessions initiated to a single virtual IP address, determining which file server should handle the new session, and transparently redirecting the client to that server, based on heuristics and collected statistics. These techniques are applicable to client systems that use standard remote file access protocols such as NFS, CIFS, HTTP or FTP.

Figure 6:
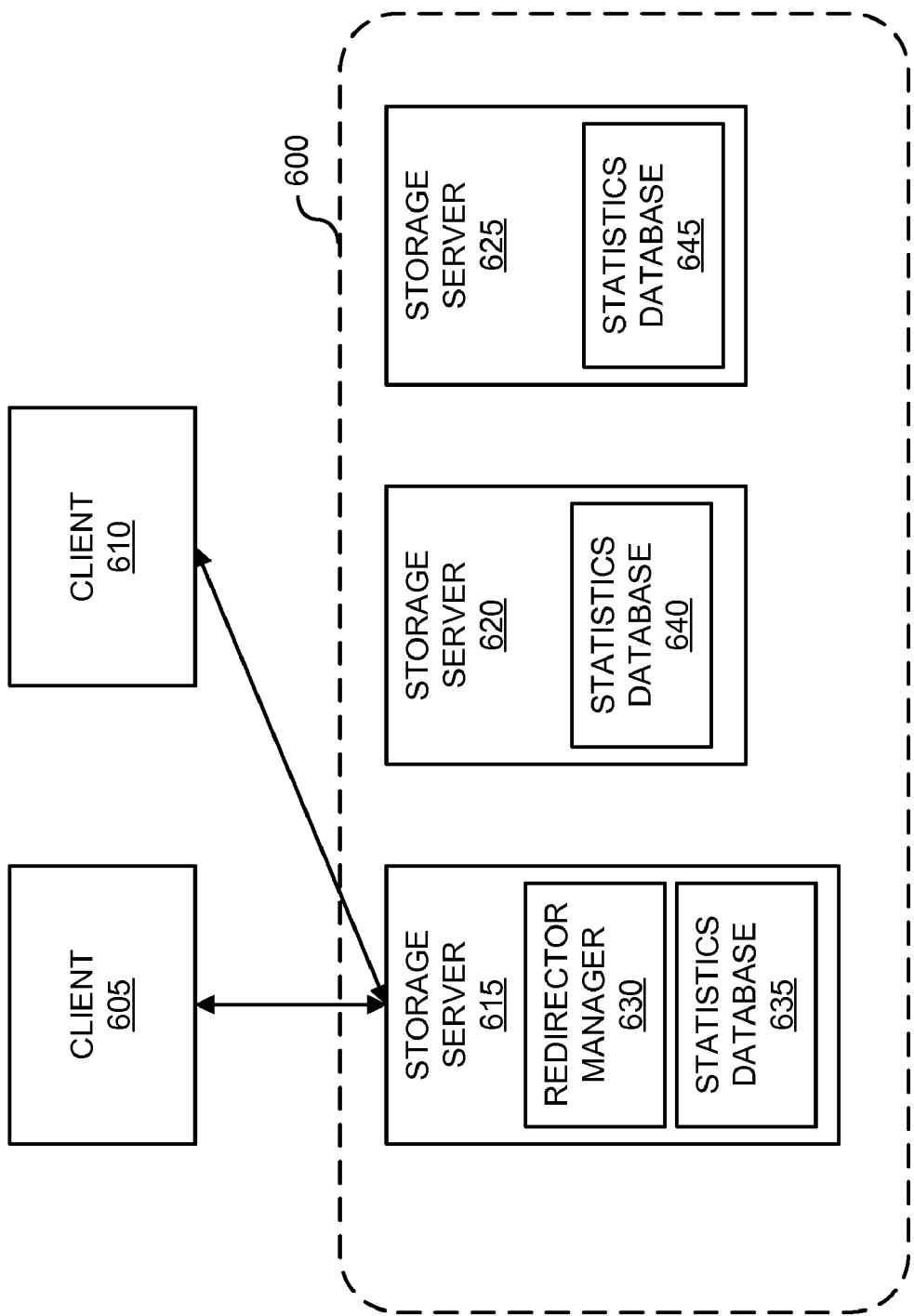
FIG. 6 is a block diagram of a storage system including a number of storage servers implementing a distributed file system with clients connecting to a virtual Internet Protocol address (VIP) according to an embodiment of the present invention.

FIG. 6 is a block diagram of a storage system 600 including a number of storage servers implementing a distributed file system with clients connecting to a virtual Internet Protocol address (VIP) according to an embodiment of the present invention. Storage system 600 includes storage servers 615, 620, and 625. Storage server 615 includes a redirection manger/module 640 and a statistics database 635. Storage server 620 includes a statistics database 640. Storage server 625 includes a statistics database 645.

Client 605 and 610 requests require access to a single virtual Internet Protocol address (VIP) associated with the storage system 600 to initiate file system mount and other file system request operations. To provide for the advertising and coordination of such a cluster-wide globally unique virtual IP address, storage nodes 615, 620, and 625 (e.g., using standard clustering technology) elect one node (e.g., storage node 615) to be the "master" or "coordinator" to advertise the virtual IP address (VIP) associated with the storage system 600 to the clients 605 and 610.

The master node typically provides important functions and services to operations of the storage system 600, but does not represent a single point of failure. According to various embodiments, if the master node (storage server 615) ever fails, the surviving nodes (storage servers 620 and 625) will elect a new master. Additionally, in some embodiments, as the network of storage servers grows larger, there is a danger that the master node could become a performance bottleneck. Various embodiments mitigate this by providing that, although the master node receives initial client request, the master nodded delegates the actual work to other storage servers in the storage system 600 which will field requests from the clients 605 and 610 directly.

Each and every storage node collects statistics for itself, stores them locally (e.g., statistics database 635), and forwards collected statistics to the master node. In one example, the storage server 615 groups the statistics into three general categories:

1) Server Statistics: These are standard server load statistics collected by standard OS and I/O management tools which include but are not limited to: Load, Packets received, Packets sent, Memory Used, Memory Free, Uptime, Protocols supported, Performance characteristic (#CPU's, other h/w attributes), and the like.

2) Client Statistics: These are collected by each server for each client which include but are not limited to: Client IP address, Client Protocol used, Client file systems accessed, Client workload, Client access pattern (read/write ratio, streaming, mixed, etc), and the like.

3) Storage Statistics: These are standard file system and I/O configuration statistics gathered by standard OS and file system management tools which include but are not limited to: Exported list of file systems, Used capacity per file system, Free capacity per file system, List of block devices in use, List of free or available block devices, and the like.

Figure 7:
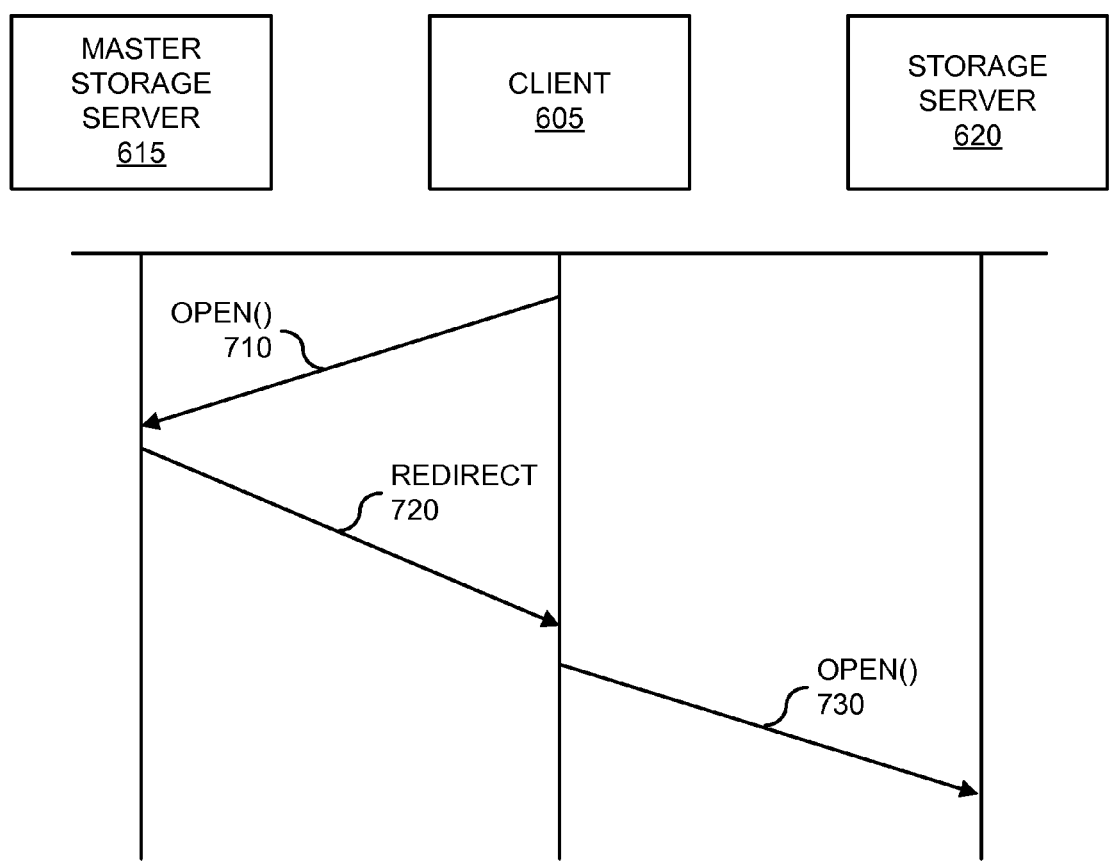
FIG. 7 illustrates a message sequence chart for client session redirection from an elected master in the storage system of FIG. 6 to an appropriate storage server according to one embodiment of the present invention.

FIG. 7 illustrates a message sequence chart for client session redirection from an elected master in the storage system of FIG. 6 to an appropriate storage server according to one embodiment of the present invention. In this example, client 605 sends a file system request (OPEN( )) 710 to the master node's VIP (e.g., to storage server 615). The master storage server 615 consults the accumulated statistics information in the statistics database 635 based on network parameters associated with the client 605, the file system being accessed, and the various statistics of all the file servers available for fielding requests selects an appropriate storage node to which the client will be redirected.

According to some embodiments, the storage server 615 accomplishes the redirection without modifying client network file protocols used by client 605. Accordingly, using built-in methods in existing network file system protocols, the storage server 615 effectively redirects the client 605 to establish a connection to a storage node chosen by the master storage server 615.

In this example, using the NFS protocol, the master storage server 615 responds (e.g., redirect 720) to the request from the client 605 with a manufactured symbolic link which includes the storage node Internet Protocol (IP) address of storage node 620 followed by a path (i.e. /10.10.0.2/engineering). Upon receiving the response 720, the client 605 uses the widely available automounter to follow this symbolic link and mount the exported file system on the storage node 620 advertised via the symbolic link. In this fashion, the client 605 has established a session with the master storage server 615 using the VIP and is transparently redirected to the storage node 620 exporting a file system based on a wide range of statistics collected from each storage server by the master.

In some embodiments, such as the case of commonly used Windows based clients using the CIFS protocol, master storage server 615 accomplishes redirection and load balancing using the same effect by masquerading to be a CIFS distributed file system (DFS) root server to CIFS clients. Upon receiving file system requests, storage server 615 returns a DFS junction point redirection response forcing the Windows CIFS client to establish a connection with a storage node chosen by the master. All subsequent file operations will be performed directly on the chosen storage node.

In some embodiments, if client 605 is using the HTTP protocol, the master storage server 615 may respond with an HTTP Redirect to the client 605 causing the HTTP client 605 to contact the new server or storage node indicated in the redirect.

In various embodiments, the client 605 performs file system operations with the target storage node 620 for the entire session. Once the session has expired, the redirection process may be repeated. The client 605 may be potentially redirected to a different storage node (e.g., storage server 625) for a subsequent session.

Rule Driven Automation

According to various embodiments, techniques and mechanism are provided for deciding which storage device (or devices) a file should be stored on. These determinations can be used to guide either the placement of new files or the replication or migration of existing files to new storage volumes. These determinations may be made on the basis of simple rules, involving a small number of readily ascertainable file attributes.

Figure 8C:
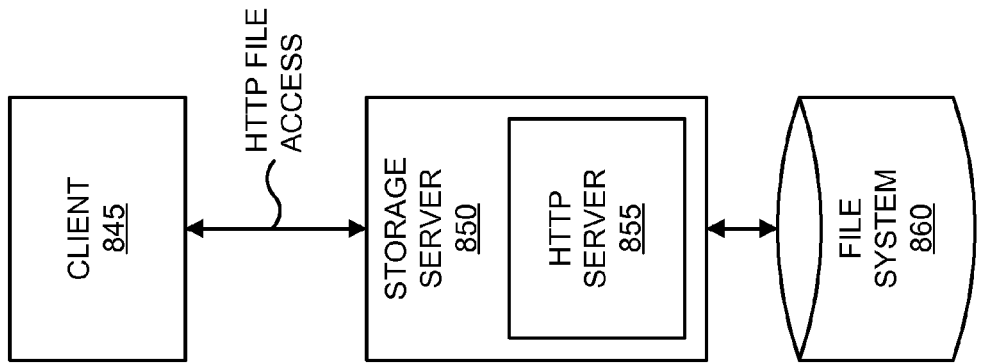
FIGS. 8A, 8B, and 8C illustrate storage systems for a network file system that may incorporate embodiments of the present invention.
Figure 8B:
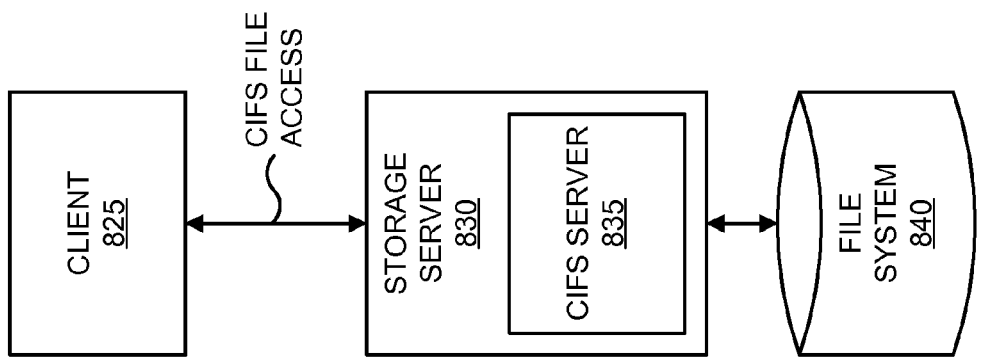
Figure 8A:
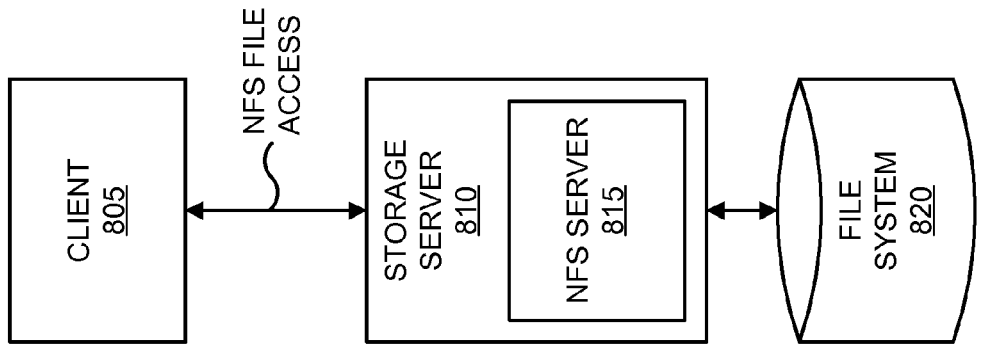

FIGS. 8A, 8B, and 8C illustrate storage systems for a network file system that may incorporate embodiments of the present invention. Referring to FIG. 8A, a client system 805 uses Network File System (NFS) file access to communicate with a storage server 810. Storage server 810 includes an NFS server 815 and is coupled to a file system 820. Referring to FIG. 8B, a client system 825 uses Common Internet File System (CIFS) file access to communicate with a storage server 830. Storage server 830 includes a CIFS server 835 and is coupled to a file system 840. Referring to FIG. 8C, a client system 845 uses hypertext transport protocol (HTTP) file access to communicated with a storage server 850. Storage server 850 includes an http server 855 and is coupled to a file system 870.

Figure 9C:
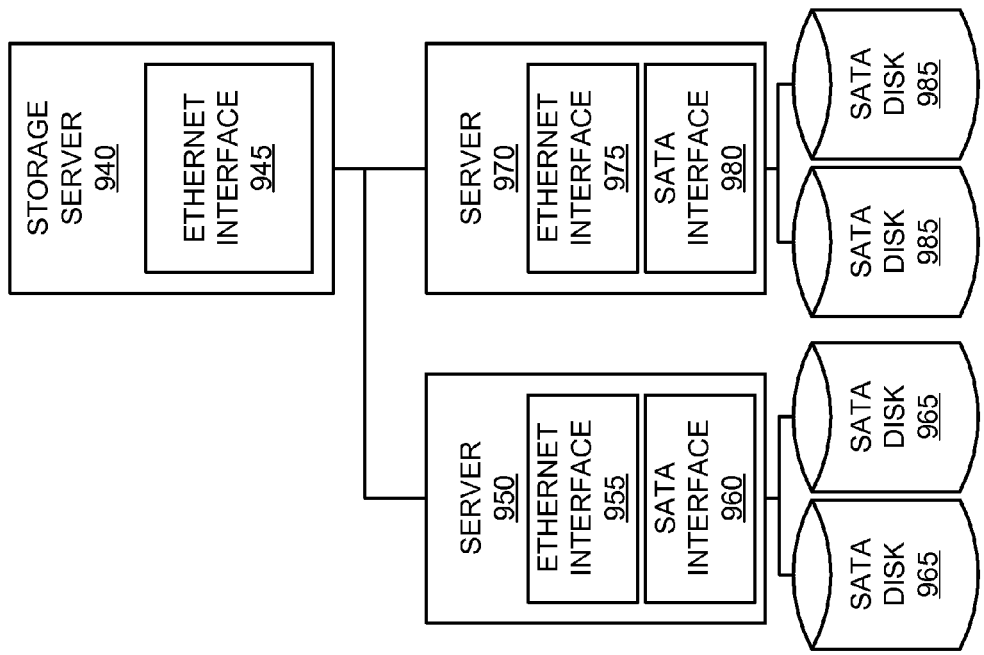
FIGS. 9A, 9B, and 9C illustrate interconnection of storage devices to multiple servers that may incorporate embodiments of the present invention.
Figure 9B:
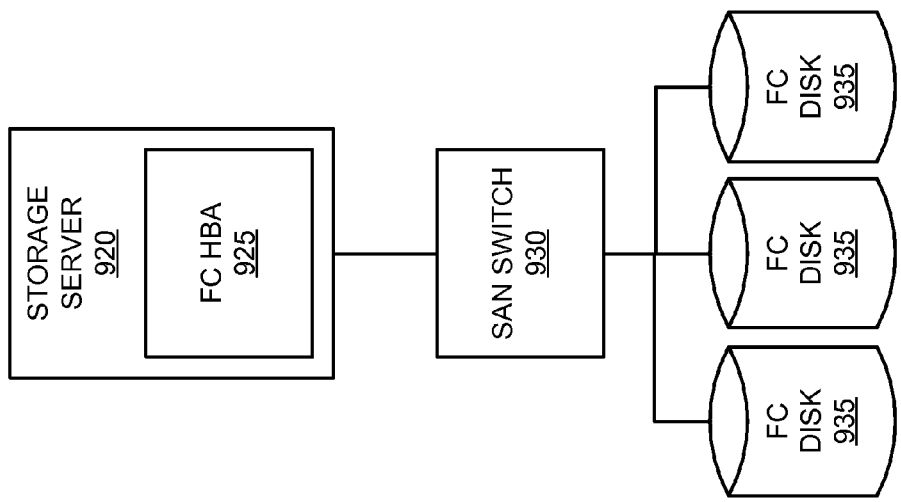
Figure 9A:
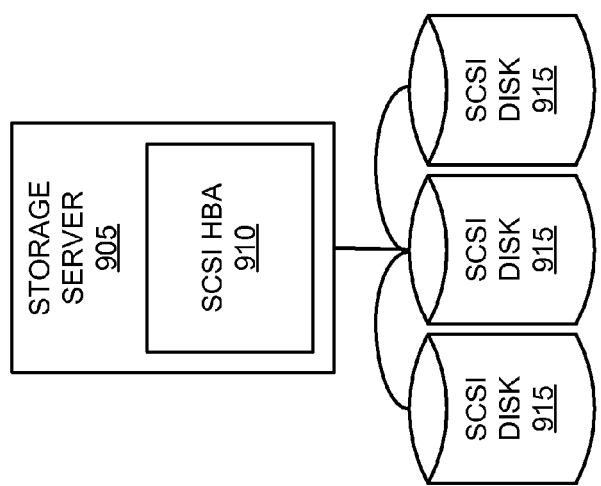

FIGS. 9A, 9B, and 9C illustrate interconnection of storage devices to multiple servers that may incorporate embodiments of the present invention. Referring to FIG. 9A, a storage server 905 includes a small computer systems interface (SCSI) host bus adapter (HBA) 910. SCSI HBA 910 is coupled to three SCSI disk drives 915. Referring to FIG. 9B, a storage server 920 includes a fiber channel (FC) HBA 925. FC HBA 925 is coupled to a storage area network (SAN) switch 930. SAN switch 930 is coupled to three FC disks 935. Referring to FIG. 9C, a storage server 940 includes an Ethernet interface 945 and is coupled to a server 950 and a server 970. Server 950 includes an Ethernet interface 955 and a serial advanced technology attachment (SATA) interface 960 coupled to the SATA disks 965. Server 970 includes an Ethernet interface 975 and SATA interface 980 coupled to two SATA disks 985.

Figure 10:
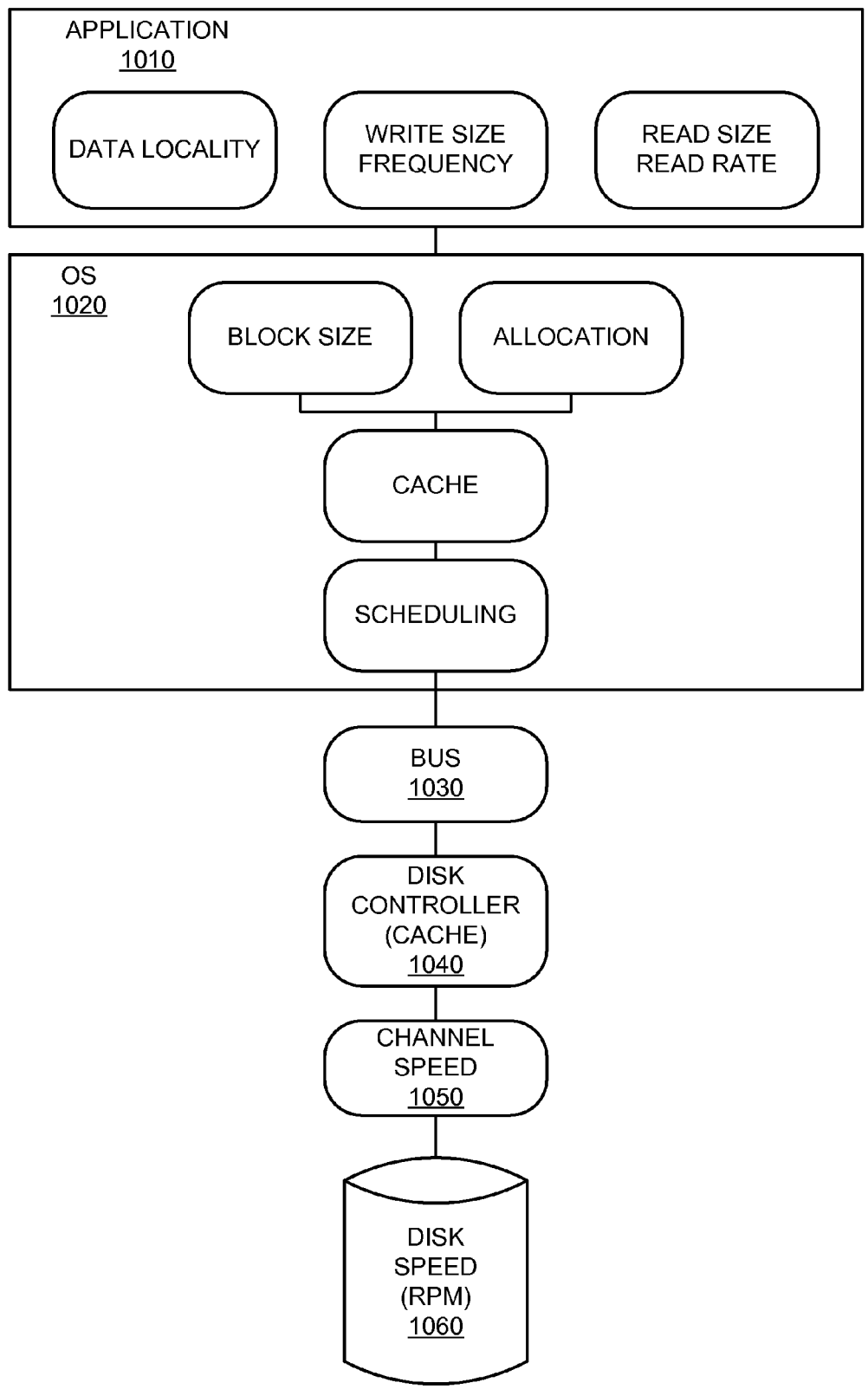
FIG. 10 is a block diagram illustrating a layering of primary performance-impacting components in remote file access that may be incorporated in embodiments of the present invention.

FIG. 10 is a block diagram illustrating a layering of primary performance-impacting components in remote file access that may be incorporated in embodiments of the present invention. Application layer 1010 includes performance-impacting components, such as data locality, write size frequency, and read size read rate. Operating system (OS) layer 1020 includes performance-impacting components block size and allocation, followed by caching and scheduling. Below OS layer 1020 are performance-impacting components, such as system bus 1030, disk controller and associated cache 1040, channel speed 1050, and disk speed (RPMs) 1060).

Figure 11A:
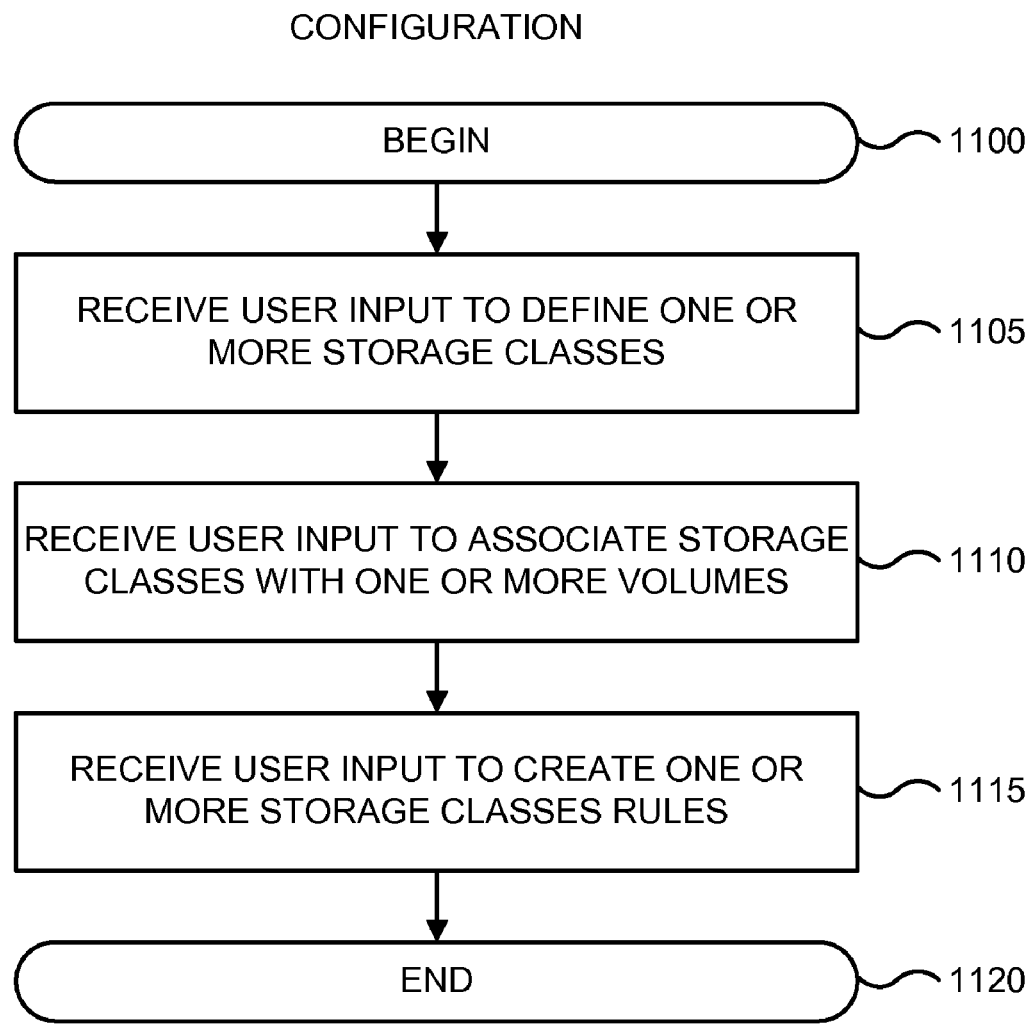
FIGS. 11A, 11B, and 11C are high level flowcharts for a method of selecting an appropriate storage volume for a file using rules according to one embodiment of the present invention.
Figure 11B:
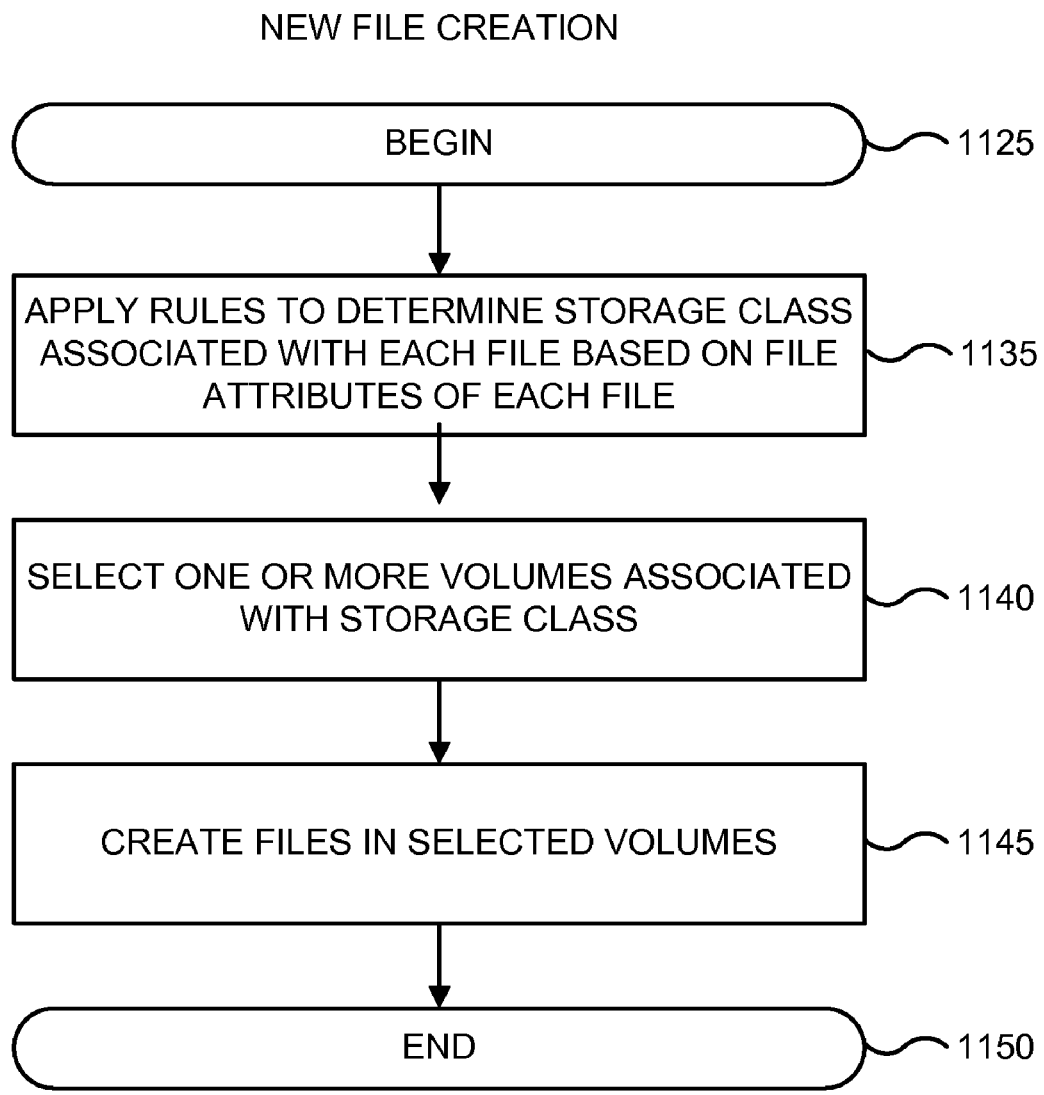
Figure 11C:
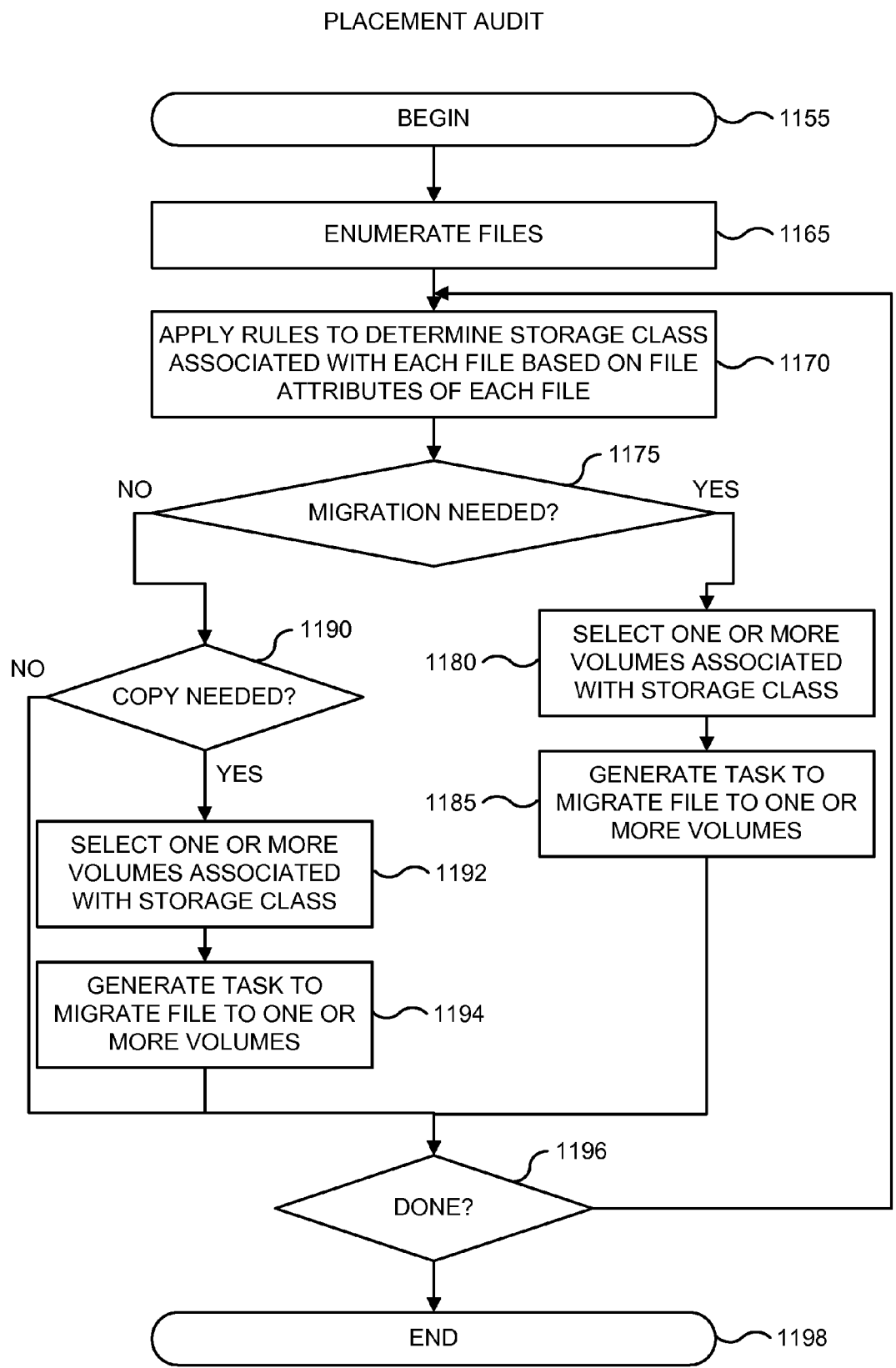

FIGS. 11A, 11B, and 11C are high level flowcharts for a method of selecting an appropriate storage volume for a file using rules according to one embodiment of the present invention. FIG. 11A begins in step 1100. In step 1105, a storage system (e.g., storage server 810) receives input from a user or system administrator to define one or more storage classes.

In general, most storage systems, storage management systems, operating systems, file systems, and remote file access protocols have a variety of tunable parameters (e.g., parameters associated with performance-impacting components such as those illustrated in FIG. 10). According to one embodiment, the user or system administrator uses a Graphical User Interface (GUI) to define new storage class names and to associate one or more storage class names with each known volume.

The terms "volume" or "storage volume" are used to generally to describe, not merely physical disk drives, but subsets of disk drives, combinations of disk drives, or any other combination of components that presents a similar randomly addressable block storage interface.

In step 1110, storage server 810 receives input from the user or system administrator to associated the storage classes with one or more volumes. In step 1115, storage server 810 receives input from the user or system administrator to create rules associated with the storage classes. In general, a rule comprises criteria for identifying a file and the rule defines a storage class for the files that satisfy the criteria. According to one embodiment, the user or system administrator may create criteria to create a rule that select files based on name related characteristics. The criteria may be specified as string-matching criteria (such as that defined by the POSIX regular expression functions, e.g., "name:*.mp3").

The user or system administrator may also specify criteria to create a rule that involves numerical characteristics (such as size and times) written as algebraic equalities (or inequalities) involving variable names (e.g., "size>128 k"). Criteria may also be specified to create rules that involve enumerated values (such as ownership, access, class, auxiliary properties, and the like) stated as Boolean statements (e.g. "owner=joe|mark"). In these embodiments, each rule involves a Boolean combination (a parenthesized expression, involving AND, OR and NOT operators) of the above described criteria expressions. One example of a Boolean statement is ((suffix:mp3) & (size>128K) & (read>3days)).

As discussed above, each rule also includes one or more storage class specifications. A storage class specification includes an optional replication factor and one or more storage classes. One example of a storage class is (3, un-cached-stream, un-cached). Storage class specifications may be modified by one or more of the following qualifiers:

- same prefer the same volume as parent directory
- different prefer different volume from parent directory
- near prefer a volume that is close to the original
- far prefer a volume that is far from the original
- leastfull prefer the least full volume
- leastbusy prefer a volume on the least busy server
- next choose volumes in a round-robin fashion In some embodiments, "near" and "far" may me implemented using a subnet address to define affinity, with same subnet being near, and different subnet being far.

While system administrators or system managers could directly write rule expressions, various embodiments of the present invention include a Graphical User Interface (GUI), wherein a user may select file characteristics and characteristic-specific tests. FIG. 11A ends in step 1120.

FIG. 11B is a flowchart of a method of rule driven automation for newly created files. FIG. 11B begins in step 1125. In some embodiment, the storage server 810 may receive a list of files. The list of files may include files to be created by the storage server 810 or another storage server. The list of files may also include one or more files to be replicated and/or migrated within a storage system.

In step 1135, the storage server 810 applies rules to determine the storage class associated with each file in the list of files based on file attributes of each file. For example, given a particular file (to be either created or to be checked for replication or migration), storage server 810 obtains values for file characteristics associated with the file and evaluates expressions in one or more rules defined by a system administrator.

In some embodiments, the storage server 810 applies each rule, in order, to the file, until the conditions specified by a rule are satisfied (e.g., evaluate to TRUE). The first rule satisfied yields one or more storage class specifications.

In step 1140, the storage server 810 determines and selects one more volumes associated with the storage class of the satisfied rule. In one embodiment, the storage server 810 starts with the first storage class specification for the first satisfied rule. Storage server 810 then identifies the volumes that satisfy that storage class specification. Storage server 810 may prioritize those volumes according to specified qualifiers (e.g., where earlier specified qualifiers have higher precedence). Storage server 810 then selects the specified number of volumes from the prioritized list.

If insufficiently many volumes are available, the storage server 810 moves on to the next storage class specification. If it is not possible for the storage server 810 to find volumes that meet those specifications, the storage server 810 may log an error message and continue evaluating subsequent rules. If no rules are satisfied or appropriate volumes do not exist, the storage server 810 may leave existing files on the volume where the files currently reside. New files are to then created on the same volume that contains their parent directory.

In step 1145, the storage server 810 creates the files on the selected volumes in the file system. FIG. 11B ends in step 1150.

FIG. 11C is a flow chart of a rule driven method for file replication and migration. FIG. 11C begins in step 1155 when the storage server performs a periodic (or event driven) audit of the correctness of file placement and replication. In step 1165, the storage server enumerates all of the managed files. For each file, in step 1170, storage server 810 applies the rules to determine the storage class associated with that file based on its attributes.

In step 1175, if migration is needed, storage server 810 selects one or more volumes associated with the determined storage class associated with the satisfied rules in step 1180. In step 1185, storage server 810 generates one or more tasks to migrate the file to the selected one or more volumes associated with the storage classes.

If migration is not needed, then in step 1190, storage server 810 determines when a copy operations is needed. If yes, storage server 810 selects one or more volumes associated with the determined storage class associated with the satisfied rules in step 1192. In step 1194, storage server 810 generates one or more tasks to copy the file to the selected one or more volumes associated with the storage classes.

In step 1196, storage server 810 determines whether all files in the list of files have been processed. If not all files have been processed, storage server 810 continues to apply the rules to the remaining files. FIG. 11C ends in step 1198.

Figure 12:
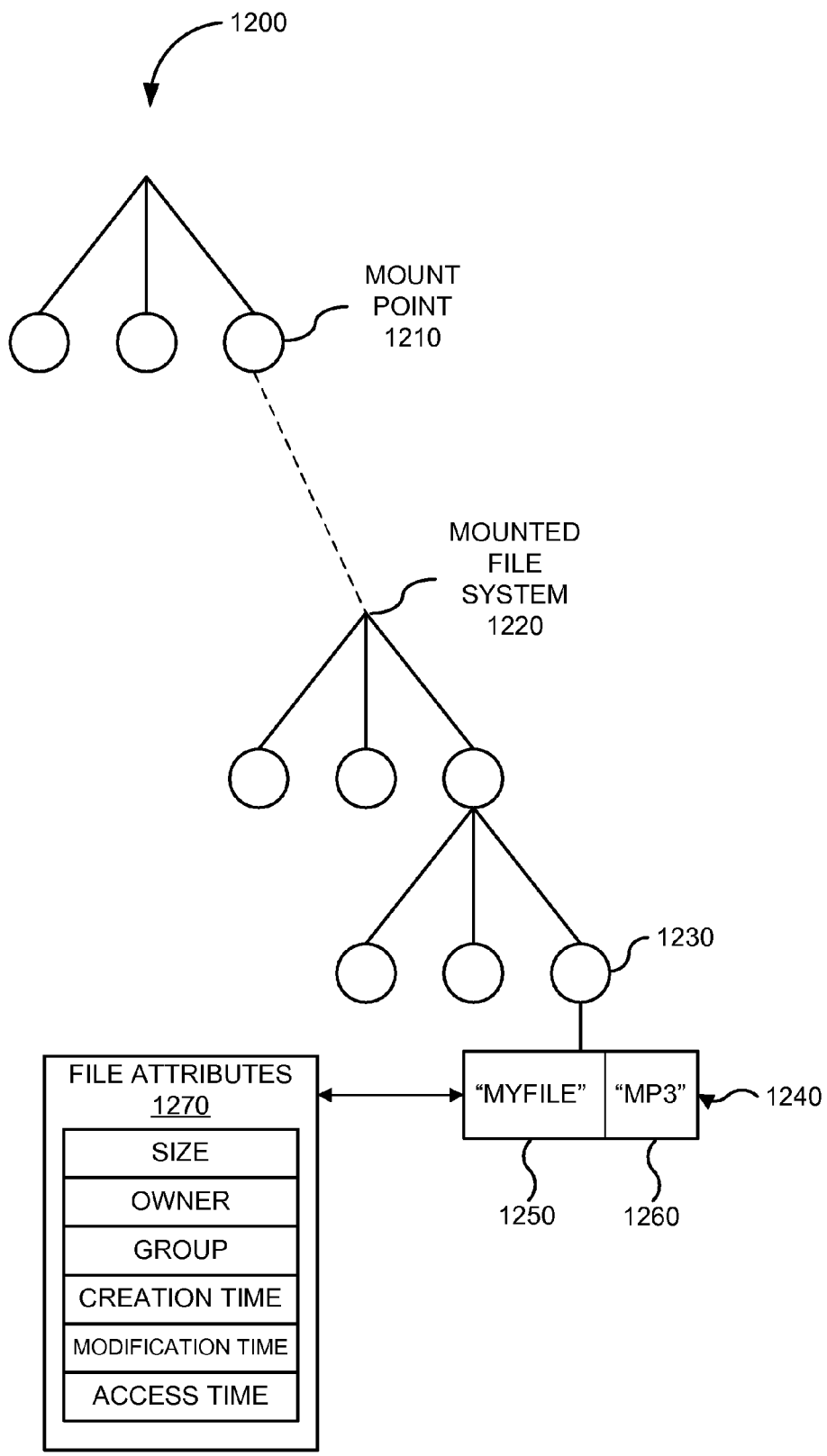
FIG. 12 is a block diagram illustrating file characteristics used for determining a storage volume according to one embodiment of the present invention.

FIG. 12 is a block diagram illustrating file characteristics used for determining a storage volume according to one embodiment of the present invention. In a file system 1200, a mounting point 1210 provides access to mounted file system 1220 including one or more directories. A sub-directory 1230 includes a file 1240 named "MYFILE.MP3." File 1240 includes a base name 1250 and a suffix 1260. File 1240 is associated with file attributes 1270. In this example, file attributes 1270 includes a size, an owner identifier, a group identifier, creation time (ctime), modification time (mtime), and access time (atime).

In general, a set of attributes and/or characteristics associated with a file that can be determined quickly and easily, without having to observe how the file is used, and are supported by most operating systems and file systems. One example of a file attribute is the name of a file. The name of the file may be broken into components, such as context (e.g., a file system or mount-point), the name of the directory in which the file resides, the suffix of the file name, a base name (after the directory and before the suffix), and the like. Other examples of attributes and/or characteristics associated with a file are the size of the file (e.g., in bytes, kilobytes, or megabytes), the time since the file was created (e.g., expressed as a number of minutes, hours, days, weeks, months, or years), the time since the file was last written, the time since the file was last read, the identity of the user who created the file (typically an alpha-numeric string, perhaps with simple punctuation), the identity of an affiliated group that enjoys special access privileges to the file, the access privileges associated with the file (typically expressed as a list of privileges or <name, privilege> pairs, the type of the file (as determined by existing operating system specific classing engines), and the like. Some operating systems and file systems allow arbitrary auxiliary properties to be associated with files.

In various embodiments, the file attributes, in addition to being easily ascertainable, may also be represented in a form that makes the file attribute easily recognized by simple rules. Many such languages are possible. FIG. 13 is an example of a general grammar for rules defining storage classes according to one embodiment of the present invention.

Replication

According to various embodiments, file system independent techniques and mechanisms for replicating files on multiple devices are provided, migrating files from one device to another (for purposes of reliability, increased bandwidth, load balancing, capacity expansion, or reduced cost), and propagating updates from a master copy to remote replicas. The mechanisms involve work queues and asynchronous file migration daemons that operate independently from and in parallel with the primary client-server and network protocol to on-disk storage data paths.

Figure 14:
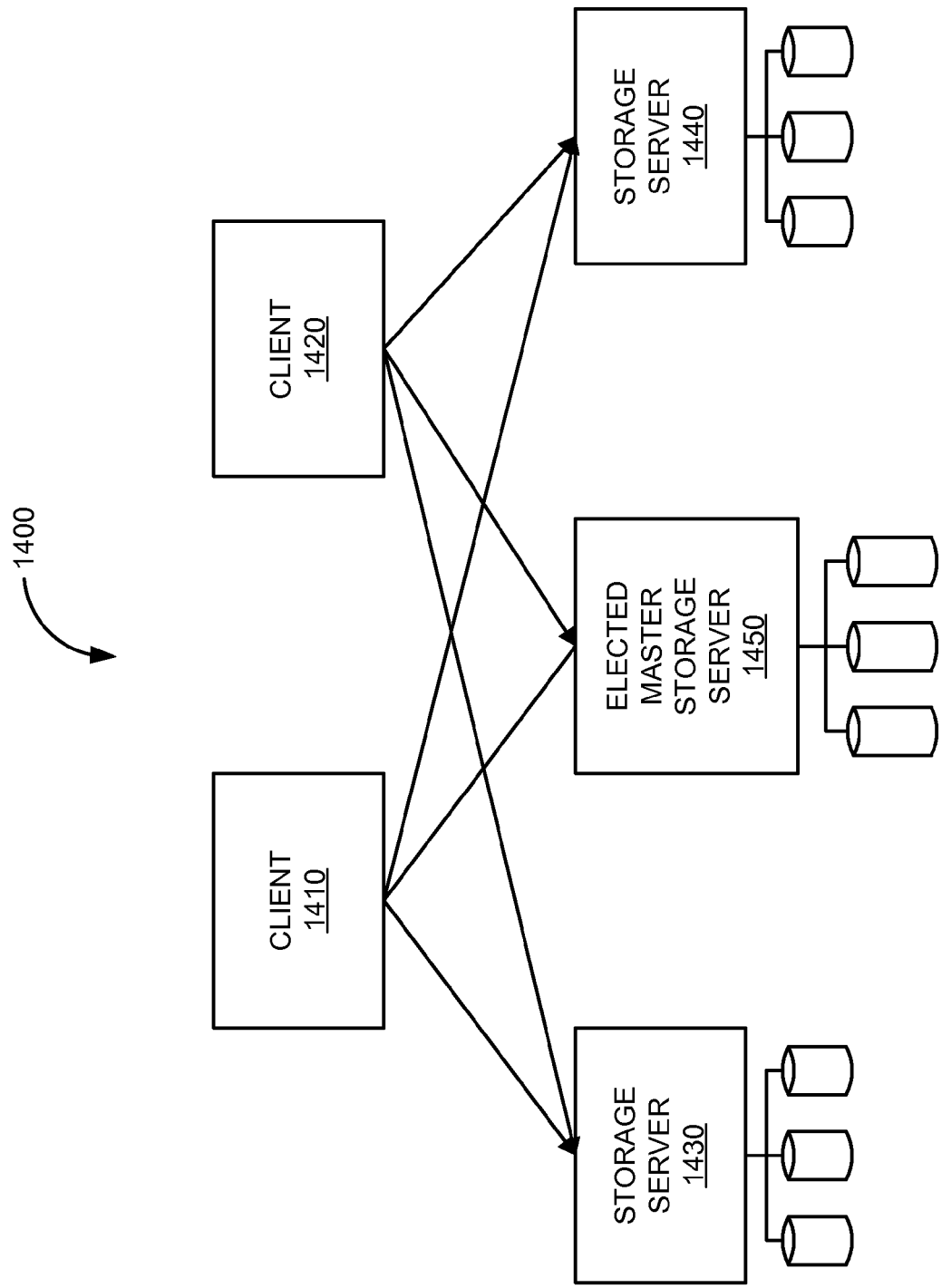
FIG. 14 is a block diagram illustrating a distributed file system with multiple client and storage server nodes, each serving its own storage volumes, where one of the storage nodes has been elected as a master according to one embodiment of the present invention.

FIG. 14 is a block diagram illustrating a distributed file system 1400 with multiple client and storage server nodes, each serving its own storage volumes, where storage node 1450 has been elected as a master according to one embodiment of the present invention. In this example, distributed file system 1400 includes clients 1410 and 1420 and storage servers 1430, 1440, and 1450.

In some embodiments, the distributed file system 1400 enables client computers 1410 and 1420 to access files from storage servers 1430, 1440, and 1450 via standard remote file system protocols. For reasons of robustness, capacity, and scalability, the storage servers 1430, 1440, and 1450 distributed the file systems Typically, clients 1410 and 1420 generate requests can be entirely performed on a single storage server. Some operations, however, require coordinated updates to other storage nodes (e.g., the other nodes that store copies of a particular file). To provide for the coordination of such cooperative updates, in various embodiments the storage servers 1430, 1440, and 1450 (e.g., using standard clustering technology) elect one node (e.g., storage server 1450 to be the "master" or "coordinator."

Figure 15:
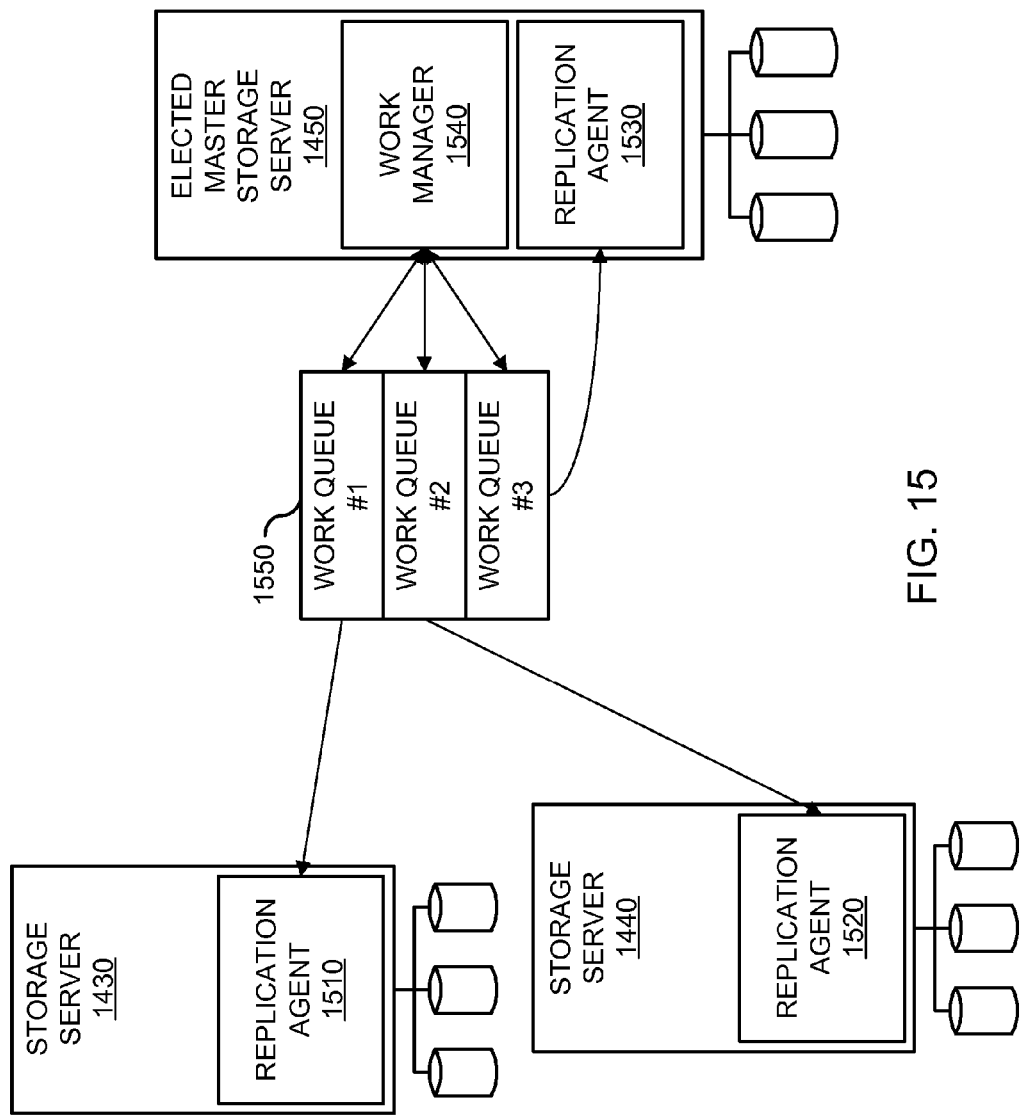
FIG. 15 is a block diagram illustrating an elected work manager and multiple storage nodes according to one embodiment of the present invention.

FIG. 15 is a block diagram illustrating elected work manager 1450 and multiple storage nodes 1430 and 1440 according to one embodiment of the present invention. In this example, each of the storage nodes 1430, 1440, and 1450 include a replication agent 1510, 1520, and 1530 respectively. Storage node 1450, as elected master, includes a work manager 1540. Work manager 1540 generates tasks to be performed by other storage servers in response to events. The tasks are placed in work queues 1550 for retrieval by the replication agents 1510, 1520, and 1530 to be performed by the respective storage nodes.

In this example, communication from the work manager 1540 to the background replication agents 1510, 1520, and 1530 is accomplished through entries in (per storage node) work queues. An entry (task) on such a queue includes, at minimum: a file name, an operation, and a completion status. The completion status reflects, at minimum, the following states:

enqueued: not yet serviced
success: operation performed successfully
failure: unable to perform operation According to some embodiments, the work manager 1540 may support one or more of the following additional states:

in progress: received, not yet completed
cancelled: requester no longer wants this operation
waiting: additional resources needed
retrying: trying to correct a problem In general, the work queues are persistent, and able to survive failures of the current master node.

Figure 16A:
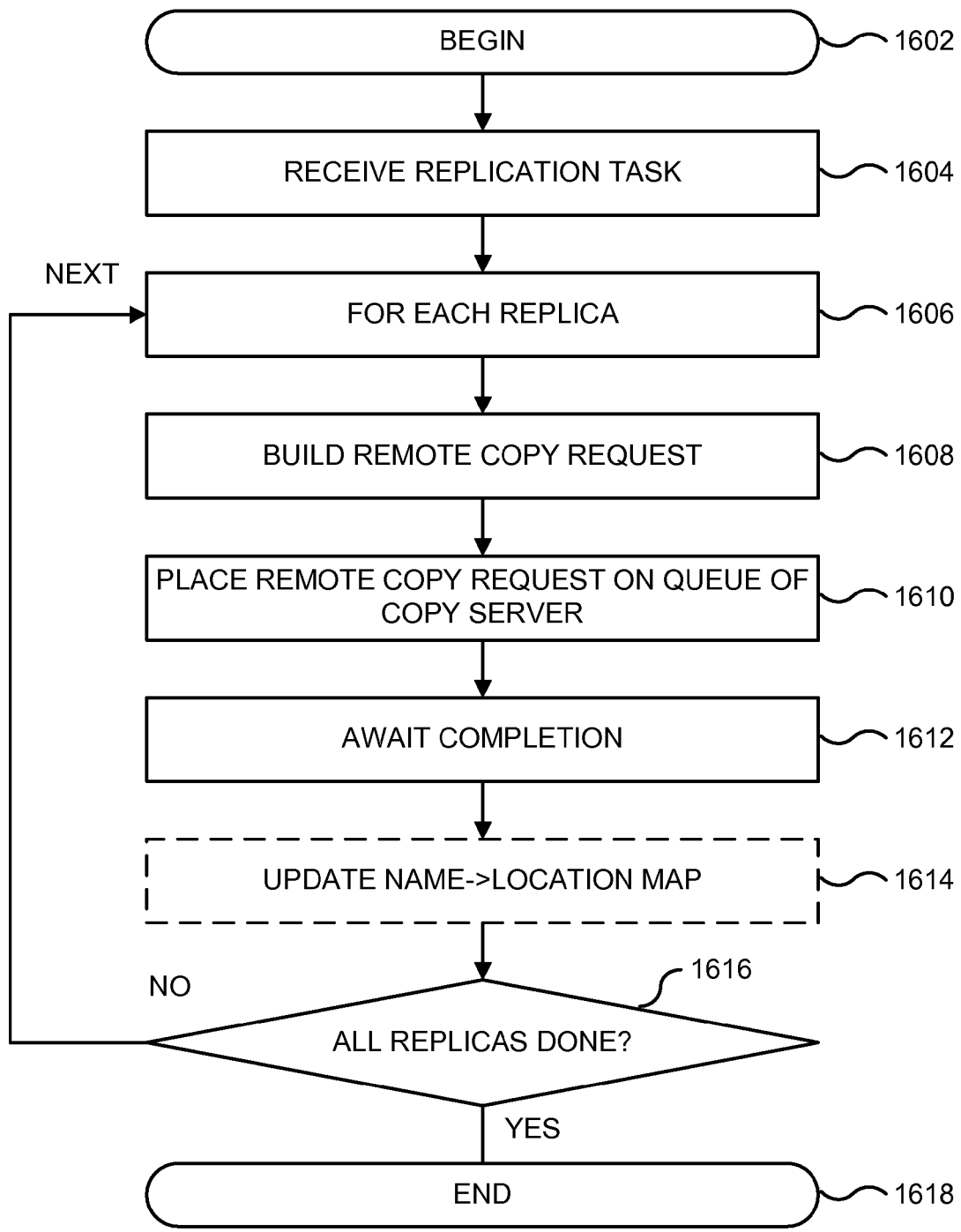
FIGS. 16A, 16B, 16C, and 16D are flowcharts of methods of managing work tasks using a work manager according to one embodiment of the present invention.

In various embodiments, the most common types of request that require coordination are:

1. file replication
2. file update propagation
3. file deletion
4. file migration FIGS. 16A, 16B, 16C, and 16D are flowcharts of methods of managing work tasks using the work manager 1540 of the storage server 1450 according to one embodiment of the present invention. FIG. 16A is a flowchart of a method for replication of files in the storage system 1400. FIG. 16A begins in step 1602. In step 1604, work manager 1540 of the master storage server 1450 receives a replication task to be performed by a storage server. For each replica to be copies in step 1606, the work manager 1540 of storage server 1450 builds a remote copy request in step 1608.

In step 1610, work manager 1540 of the master storage server 1450 places the remote copy request on the work queue 1550 of the storage server that will create the replica. In step 1612, work manager 1540 of storage server 1450 awaits completion of the remote copy request. Optionally, in step 1614, work manager 1540 of storage server 1450 updates a file to location map in response to the completed remote copy request.

In step 1616, work manager 1540 of master storage server 1450 determines whether all replicas are done. If not, the next replica is created beginning in step 1606. If all replicas are done in step 1616, FIG. 16A ends in step 1618.

In step 1625, work manager 1540 of the master storage server 1450 determines whether the event indicates a replication file operation. If yes, work manager 1540 of the storage server 1450 generates a task to perform a remote copy of a file to one or more storages servers that store a replica of the file in step 1620.

Figure 16B:
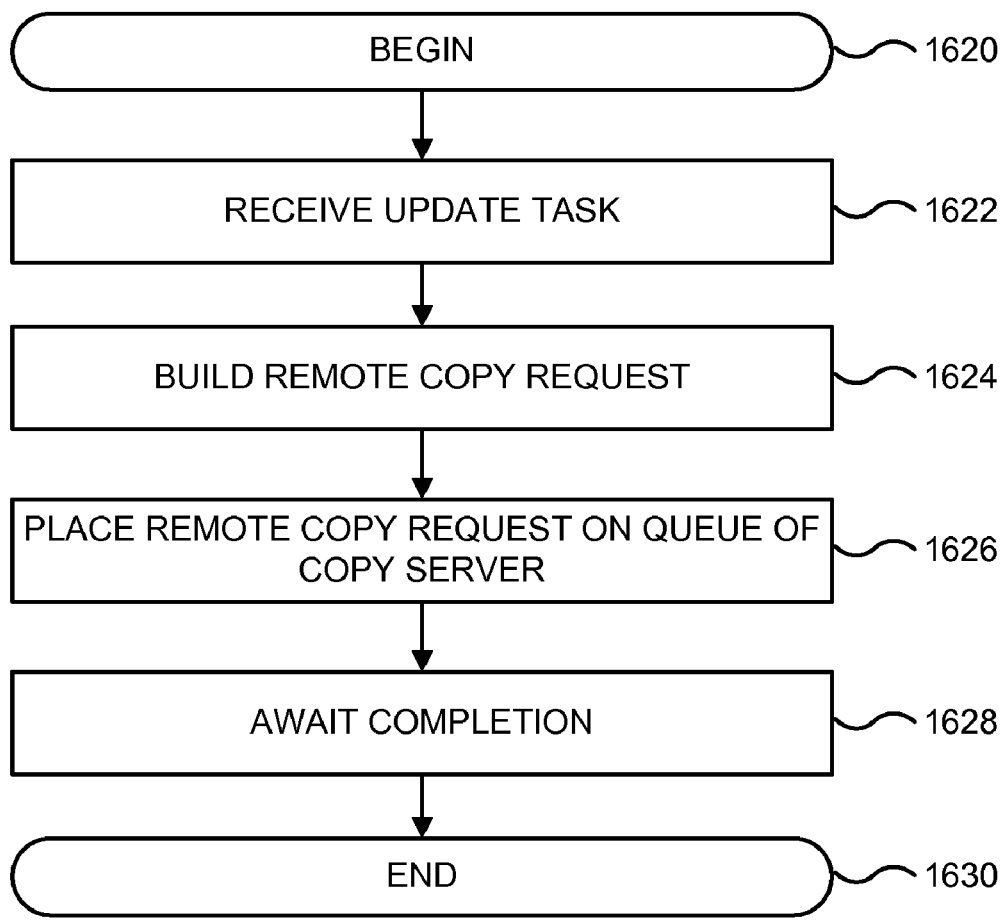

FIG. 16B is a flowchart of a method for updating files in the storage system 1400. FIG. 16B begins in step 1620. In step 1622, work manager 1540 of the master storage server 1450 receives an update task to be performed by a storage server. In step 1624, work manager 1540 of the storage server 1450 builds a remote copy request.

In step 1626, work manager 1540 of the master storage server 1450 places the remote copy request on the work queue 1550 of the storage server that will update the copy of the file. In step 1628, work manager 1540 of storage server 1450 awaits completion of the remote copy request. FIG. 16B ends in step 1618.

Figure 16C:
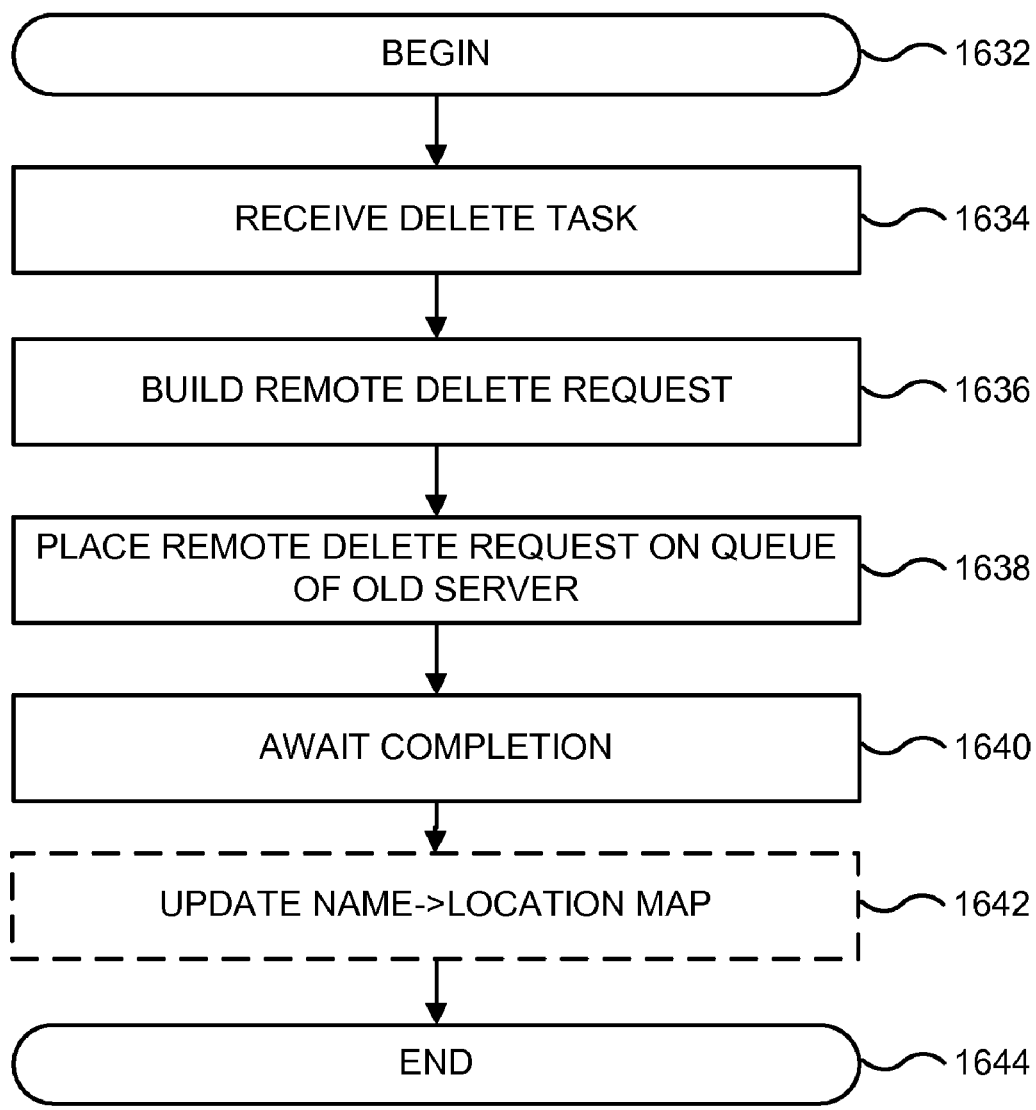

FIG. 16C is a flowchart of a method for deleting files in the storage system 1400. FIG. 16B begins in step 1632. In step 1634, work manager 1540 of the master storage server 1450 receives a delete task to be performed by a storage server. In step 1636, work manager 1540 of the storage server 1450 builds a remote delete request.

In step 1638, work manager 1540 of the master storage server 1450 places the remote delete request on the work queue 1550 of the storage server that will delete the file. In step 1640, work manager 1540 of storage server 1450 awaits completion of the remote delete request. Optionally, in step 1642, work manager 1540 of storage server 1450 updates a file to location map in response to the completed remote delete request. FIG. 16C ends in step 1644.

Figure 16D:
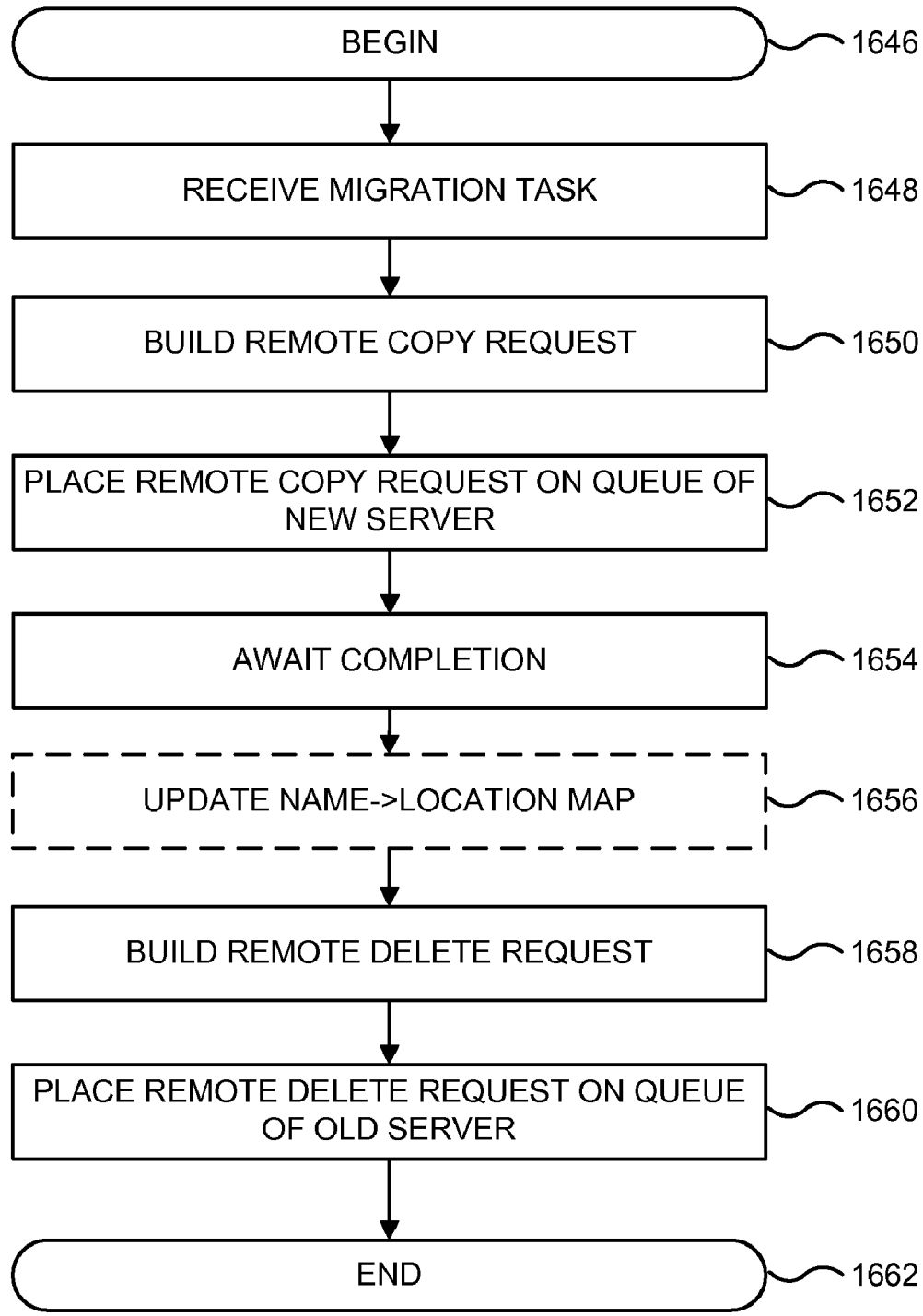

FIG. 16D is a flowchart of a method for migrating files in the storage system 1400. FIG. 16D begins in step 1646. In step 1648, work manager 1540 of the master storage server 1450 receives an migration task to be performed by a storage server. In step 1650, the work manager 1540 of storage server 1450 builds a remote copy request.

In step 1652, work manager 1540 of the master storage server 1450 places the remote copy request on the work queue 1550 of the storage server that will copy the file to perform the migration. In step 1654, work manager 1540 of storage server 1450 awaits completion of the remote copy request. Optionally, in step 1656, work manager 1540 of storage server 1450 updates a file to location map in response to the completed remote copy request.

In step 1658, work manager 1540 of the master storage server 1450 builds a remote delete request. In step 1660, work manager 1540 of the master storage server 1450 places the remote delete request on the work queue 1550 of the storage server that will delete the file to complete the migration. Optionally, work manager 1540 of storage server 1450 may await completion of the remote delete request. FIG. 16D ends in step 1662.

In some embodiments, the work manager 1540 of master storage server 1450 may incorporate a function that automatically maps file names into the identity of a storage node that stores that file. Where such mapping functions exist, the work manager 1530 of the storage server 1450 also updates that map: 1) to reflect the location of new copies after a successful replication 2) to reflect the new location after a migration, and 3) before the deletion of the original copy to reflect deletions.

Figure 17:
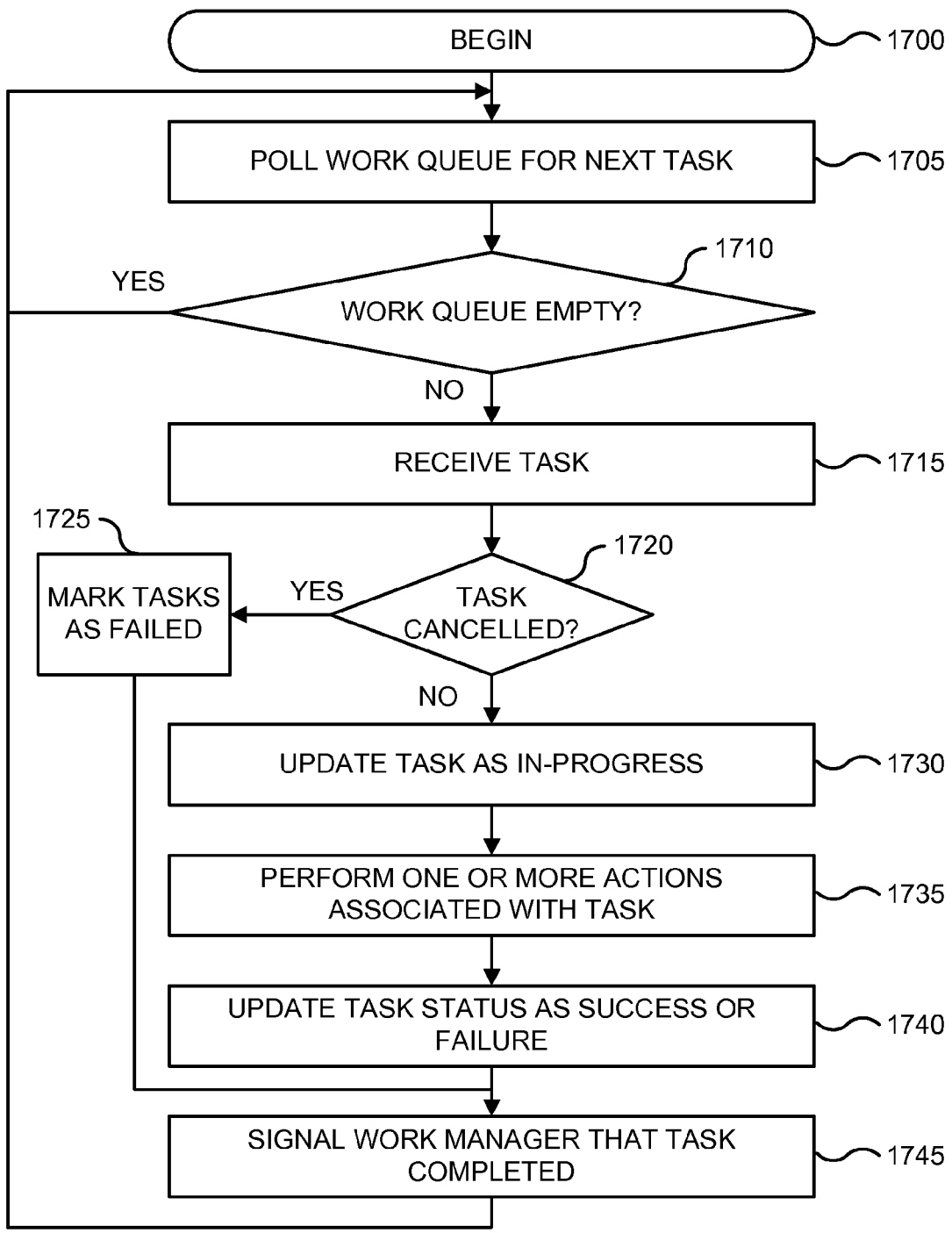
FIG. 17 is a flowchart of a method of servicing work queues using a remote replication agent according to one embodiment of the present invention.

FIG. 17 is a flowchart of a method of servicing work queues using remote replication agent 1510 of storage server 1430 according to one embodiment of the present invention. FIG. 17 begins in step 1700. In step 1700, the storage server 1430 polls the work queue 1550 of the master storage server 1450 for the next task. If the work queue 1550 is empty, the replication agent 1510 of storage server 1430 waits for a predetermined period of time before checking the work queue 1550 for additional tasks.

If there are tasks in the work queue 1550 for storage server 1430, in step 1715, the storage server 1430 receives the next task. In step 1720, the storage server 1430 determines whether the task has been cancelled. If the task has been cancelled, the storage server 1430 marks the task as failed in step 1725. If the task has not been cancelled, in step 1730, the storage server 1430 updates the work manager 1540 of master storage server 1450 that the task received from the work queue 1550 is in-progress.

In step 1735, the storage server 1430 performs the received task. Storage server 1430 may perform one or more actions associated with the task. Some examples of actions are to copy a file, delete a file, replicate a file, and the like. In step 1740, the storage server 1430 updates the master storage server 1450 with the results of the one or more actions performed. In some embodiments, the storage server 1430 updates the master storage server 1450 with a success or failure based on the performances of the one or more actions.

In step 1745, the storage server 1430 signals the work managers 1540 of master storage server 1450 that the task is complete. The storage server 1430 also signals the work managers 1540 of master storage server 1450 that the task is complete if the task has been cancelled in step 1720. In either event, storage server 1430 then continues to poll the work queue 1550 for the next task in step 1705.

In various embodiment, in each case the storage server 1430 requests the next operation from its associated queue, updates the status to show the request is in progress, performs the task, updates the status of the request to reflect success or failure, and then signals the work coordinator that the request is complete.

In some embodiments, for remote copy operations, the remote replication agent 1510 of the storage server 1430 opens and reads the remote file, and then writes that data into a file on the specified local file system. In one embodiment, remote files are obtained via NFS cross mounts. In another implementation, remote files are obtained via HTTP. In another embodiment, remote files are obtained via FTP.

There are many possible implementations of highly available distributed work queues. In one embodiment, the work queues 1550 are implemented via remote procedure calls which are mirrored to a designated successor to the current master node. In another embodiment, the work queues 1550 are implemented as updates to a shared highly available database.

Figure 18:
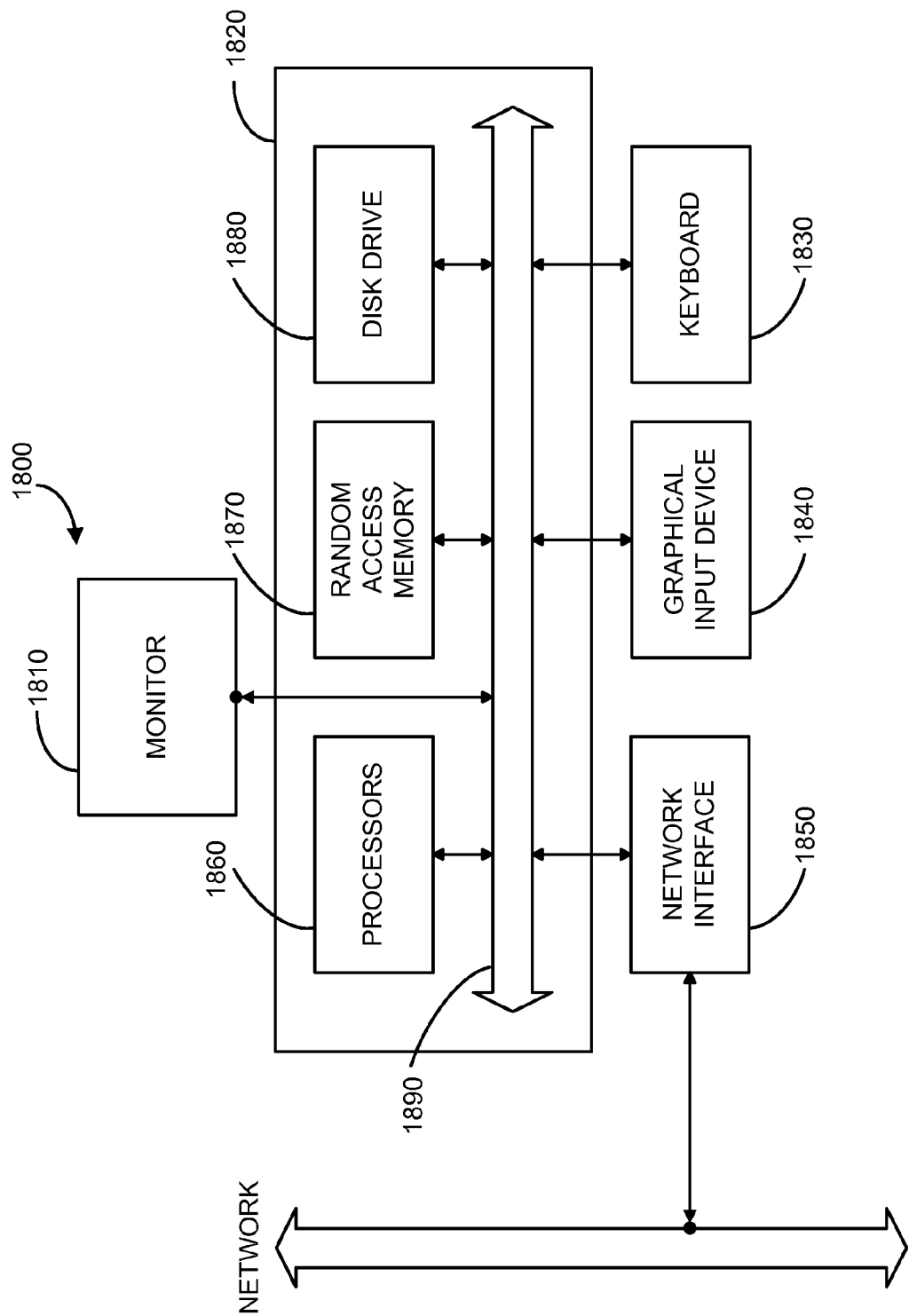
FIG. 18 is a block diagram of a computer system suitable for implementing embodiments of the present invention.

FIG. 18 is a block diagram of a computer system 1800 suitable for implementing an embodiment of the present invention. Computer system 1800 typically includes a monitor 1810, computer 1820, a keyboard 1830, a user input device 1840, and a network interface 1850. User input device 1840 includes a computer mouse, a trackball, a track pad, graphics tablet, touch screen, and/or other wired or wireless input devices that allow a user to create or select graphics, objects, icons, and/or text appearing on the monitor 1810. Embodiments of network interface 1850 typically provides wired or wireless communication with an electronic communications network, such as a local area network, a wide area network, for example the Internet, and/or virtual networks, for example a virtual private network (VPN).

Computer 1820 typically includes components such as one or more general purpose processors 1860, and memory storage devices, such as a random access memory (RAM) 1870, disk drives 1880, and system bus 1890 interconnecting the above components. RAM 1870 and disk drive 1880 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A storage system comprising:
   a control node comprising a first server including a processor and configured to store object identifiers and location information associated with a plurality of files in a file system, the object identifiers each corresponding to a cluster-wide globally unique identifier used to name and store a file in the storage system and the location information each associated with at least one of a logical and physical location of the file in the file system;
   a plurality of storage nodes each comprising a storage server including a processor and configured to store the plurality of files in the file system, wherein a first storage node in the plurality of storage nodes corresponds to a master storage server configured to advertise a virtual IP address for the storage system and to receive a request for a file from a client, to communicate with the control node to determine an object identifier and location information associated with the file, and to access the file from an object storage of the master storage server using the object identifier and location information associated with the file if the object identifier and the location information indicates that the object storage of the master storage server includes the file, and to otherwise request the file from a second storage node based on the object identifier and the location information, to service the request from the client; and
   a token manager configured to coordinate access to the file, where the file is stored at a first location of the file system and at a second location of the file system;
   wherein the token manager is configured to generate a first token corresponding to a lease for a file system operation on the file, the first token including a first access time and volume information, in response to a first request from a first storage node to access the file, the first token allowing the first storage node to access the file in the first location based on the first access time, the first storage node including a timer set to a value shorter than the first access time, and wherein the first storage node is to determine whether to renew the first token when the timer times out.

2. The storage system of claim 1 wherein the control node is further configured to store namespace and metadata associated with the plurality of files.

3. The storage system of claim 1 wherein the control node is configured to store the object identifiers associated with the plurality of files using a file system at the control node.

4. The storage system of claim 1 wherein the control node is configured to store the location information associated with the plurality of files using a database.

5. The storage system of claim 1 wherein the first storage node is configured to use the object identifier and location information associated with the file to access the file from a remote object storage available on the second storage node in the plurality of storage nodes.

6. The storage system of claim 3 wherein the first storage node is configured to use the object identifier and location information associated with the file to access the file from a portion of the file system located at the first storage node.

7. The storage system of claim 1,
   wherein the token manager is configured to generate a second token including a second access time in response to a second request from the second storage node to access the file, the second token allowing the second storage node to access the file in the second location based on the second access time.

8. A computer implemented method of servicing requests for files in a file system of a storage system, the method comprising:
   storing object identifiers and location information associated with a plurality of files;
   receiving a request for a file from a client in a master storage server of a plurality of storage servers of the file system, the master storage server to receive client requests for the file system via a globally unique virtual IP address advertised by the master storage server;
   determining an object identifier and location information associated with the file in a control node of the storage system responsive to a communication from the master storage server to the control node;
   accessing the file using the object identifier and location information associated with the file to service the request from the client;
   generating a first token corresponding to a lease for a file system operation on the file including a first access time and volume information in response to a first request from a first storage node to access the file, the first token allowing the first storage node to access the file in a first location of the file system based on the first access time; and
   generating a second token including a second access time in response to a second request from a second storage node to access the file, the second token allowing the second storage node to access the file in a second location of the file system based on the second access time.

9. The method of claim 8 further comprising storing metadata associated with the plurality of files.

10. The method of claim 8 wherein storing the object identifiers associated with the plurality of files comprises storing the object identifiers using the file system.

11. The method of claim 8 wherein storing the location information associated with the plurality of files comprises storing the location information using a database.

12. The method of claim 8 wherein accessing the file using the object identifier and location information associated with the file to service the request from the client comprises accessing the file by the first storage node from a remote object storage available on the second storage node.

13. The method of claim 8 wherein accessing the file using the object identifier and location information associated with the file to service the request from the client comprises accessing the file from a portion of the file system located at a storage node.

14. The method of claim 8 further comprising determining whether to renew the first token when a timer set at a value shorter than the first access time of the first token times out.

15. A computer readable storage medium comprising instructions that when executed by a computer system having a processor, enable the computer system to:
   store metadata for a plurality of files of a file system in a control node of a storage system, the metadata including object identifiers and location information associated with the plurality of files;
   receive a request for a file from a client in a master storage server of a plurality of storage servers, the master storage server elected to receive client requests for the plurality of storage servers, wherein the plurality of storage servers store the files of the file system separated from the metadata;

determine based at least in part on statistics of the plurality of storage servers a selected one of the storage servers to handle the client request;

communicate with the control node regarding the client request to determine an object identifier and location information associated with the file;

access the file in one of the plurality of storage servers using the object identifier and location information associated with the file to service the request from the client, wherein the file is stored at a first location of the file system and at a second location of the file system;

generate a first token corresponding to a lease for a file system operation on the file including a first access time and volume information in response to a first request from a first storage node to access the file, the first token allowing the first storage node to access the file in the first location based on the first access time, wherein the first storage node includes a timer set to a value shorter than the first access time of the first token, and is to determine whether to renew the first token when the timer times out;

generate a second token corresponding to a lease for a file system operation on the file including a second access time and volume information in response to a second request from a second storage node to access the file, the second token allowing the second storage node to access the file in the second location based on the second access time; and wherein the instructions reside on the computer readable storage medium.

16. The computer readable storage medium of claim 15 further comprising instructions that enable the computer system to store metadata associated with the plurality of files.

17. The computer readable storage medium of claim 15 wherein the instructions to store the object identifiers associated with the plurality of files comprises code for storing the object identifiers using the file system.

18. The computer readable storage medium of claim 15 wherein the instructions to store the location information associated with the plurality of files comprises code for storing the location information using a database.

19. The computer readable storage medium of claim 15 wherein the instructions to access the file using the object identifier and location information associated with the file to service the request from the client comprises code for accessing the file by a first storage node from a remote object storage available on the second storage node.

20. The computer readable storage medium of claim 15 wherein the instructions to access the file using the object identifier and location information associated with the file to service the request from the client comprises code for accessing the file from a portion of the file system located at a storage node.

* * * * *